US011825864B2

(12) United States Patent
Kuerzinger et al.

(10) Patent No.: US 11,825,864 B2
(45) Date of Patent: Nov. 28, 2023

(54) PALATABLE PET FOOD COMPOSITION

(71) Applicant: SPECTRUM BRANDS, INC., Middleton, WI (US)

(72) Inventors: Hubert Kuerzinger, Melle (DE); Scott T. Piering, Middleton, WI (US); Dietmar Kuhlmann, Melle (DE); Ines Möller, Melle (DE)

(73) Assignee: Spectrum Brands, Inc., Middleton, WI (US)

( * ) Notice: Subject to any disclaimer, the term of this patent is extended or adjusted under 35 U.S.C. 154(b) by 210 days.

(21) Appl. No.: 16/959,055

(22) PCT Filed: Dec. 29, 2017

(86) PCT No.: PCT/US2017/068982
§ 371 (c)(1),
(2) Date: Jun. 29, 2020

(87) PCT Pub. No.: WO2019/132983
PCT Pub. Date: Jul. 4, 2019

(65) Prior Publication Data
US 2020/0337335 A1    Oct. 29, 2020

(51) Int. Cl.
| | |
|---|---|
| A61K 36/00 | (2006.01) |
| A23K 10/30 | (2016.01) |
| A23K 20/174 | (2016.01) |
| A23K 20/105 | (2016.01) |
| A23K 20/111 | (2016.01) |
| A23K 20/121 | (2016.01) |
| A23K 20/147 | (2016.01) |
| A23K 20/158 | (2016.01) |
| A23K 20/179 | (2016.01) |

(52) U.S. Cl.
CPC ............ *A23K 10/30* (2016.05); *A23K 20/105* (2016.05); *A23K 20/111* (2016.05); *A23K 20/121* (2016.05); *A23K 20/174* (2016.05); *A23K 20/147* (2016.05); *A23K 20/158* (2016.05); *A23K 20/179* (2016.05)

(58) Field of Classification Search
CPC .................................................... A23K 20/174
See application file for complete search history.

(56) References Cited

U.S. PATENT DOCUMENTS

| | | | |
|---|---|---|---|
| 2013/0059057 A1 | 3/2013 | Mizuuchi et al. | |
| 2013/0251865 A1 | 9/2013 | Cutler et al. | |
| 2013/0323389 A1* | 12/2013 | Nugent .................. | A23D 9/007 426/546 |

FOREIGN PATENT DOCUMENTS

| | | | | |
|---|---|---|---|---|
| CN | 102228303 A | * | 11/2011 | |
| CN | 102939079 B | * | 1/2016 | ............. A61K 31/20 |
| CN | 105520149 A | | 4/2016 | |
| CN | 105918774 A | * | 9/2016 | |
| CN | 106190749 A | * | 12/2016 | |
| EP | 2578087 A1 | | 4/2013 | |
| JP | S49-79895 A | | 8/1974 | |
| JP | 2012-005478 A | | 1/2012 | |
| WO | 2017/085099 A1 | | 5/2017 | |

OTHER PUBLICATIONS

Kmiecik et al, Stabilisation of phytosterols by natural and synthetic antioxidants in high temperature conditions. Food Chemistry (2015), vol. 173, pp. 966-971 (Year: 2015).*
Deobald et al, Effect of antioxidants and synergists on the stability of precooked dehydrated sweetpotato flakes. Food Technol, (1964) vol. 18, No. 12, pp. 146-151 (Year: 1964).*
Office Action for Japanese Patent Application No. 2020-556219 (dated Oct. 12, 2021).
Romano, C.S. et al., "Synergistic antioxidant and antibacterial activity of rosemary plus butylated derivatives", Food Chemistry, vol. 115: 456-461 (2009).
Hras, A.R. et al., "Comparison of antioxidative and synergistic effects of rosemary extract with alpha-tocopherol ascorbyl palmitate and citric acid in sunflower oil", Food Chemistry, vol. 71: 229-233 (2000).
Jennings, B.H. et al., "Effectiveness of natural versus synthetic antioxidants in a rice bran oil-based structured lipid", Food Chemistry, vol. 114: 1456-1461 (2009).
Burton, G.W. et al., "Autoxidation of Biological Molecules. 1. The Antioxidant Activity of Vitamin E and Related Chain-Breaking Phenolic Activity of Vitamin E and Related Chain-Breaking Phenolic Antioxidants in Vitro", J. Am. Chem Soc. 103: 6472-6477 (1981).
Becker, C.C., Hølmer, G. et al., "Regiospecific Analysis of Triacylglycerols Using Allyl Magnesium Bromide", LIPIDS, vol. 28, No. 2: 147-149 (1993).
Bohne, V.J.B. et al., "Accumulation and depuration of the synthetic antioxidant ethoxyquin in the muscle of Atlantic salmon (*Salmo salar* L.)", Food and Chemical Toxicology 46: 1834-1843 (2008).
Winther, K., Hølmer, G. et al., "Decreased Platelet Activity Withut Change in Fibrinolytic Activity After Low Dosages of Fish Oil", Angiology—The Journal of Vascular Diseases: 39-44 (1993).
Lindskov, R. et al., "Polyunsaturated fatty acids in plasma, red blood cells and mononuclear cell phospholipids of patients with atopic dermatitis", Allergy, Fatty acids in atopic dermatitis: 517-521 (1992).

(Continued)

*Primary Examiner* — Qiuwen Mi
(74) *Attorney, Agent, or Firm* — Melissa M. Hayworth; Merchant & Gould PC

(57) ABSTRACT

The invention relates to a pet food composition comprising at least one natural antioxidant and at least one synthetic antioxidant and at least one acidity regulator component to regulate the pH, wherein the pet food composition does not contain 1,2-dihydro-6-ethoxy-2,2,4-trimethylquinoline. Further, the invention comprises a method of producing the pet food composition as well as the use of the pet food composition.

12 Claims, 1 Drawing Sheet

(56) References Cited

OTHER PUBLICATIONS

Rosenquist, A. et al., "Nutritional value of micro-encapsulated fish oils in rats", Z Ernährungswiss 35: 178-184 (1996).
Kaasgaard, S.G. et al., "Effects of Dietary Linseed Oil and Marine Oil on Lipid Peroxidation in Monkey Liver in vivo and in vitro", LIPIDS, vol. 27, No. 10: 740-745 (1992).
International Search Report and Written Opinion for PCT/US2017/068982, dated Sep. 21, 2018.
A. Blaszczyk et al., "Ethoxyquin: An Antioxidant Used in Animal Feed", International Journal of Food Science, 2013: 1-12 (2013).
Search Report for European Patent Application No. 17935905.4 (dated Jul. 15, 2021).

\* cited by examiner

| Weight increase %/ pisces | Control Diet | Diet SC | Diet NC | Diet SNC |
|---|---|---|---|---|
| Supplementation | without | synthetic: Butylhydroxyanisol Propyl-3,4,5-trihydroxybenzoat  pH: citric acid | natural: Tocopherols Rosemary extract pH: citric acid | synthetic: Butylhydroxyanisol Propyl-3,4,5-trihydroxybenzoat natural: Tocopherols Rosemary extract pH: citric acid |
| Red Phantom Tetra | 137 | 137 | 135 | 156 |
| Yellow Cichlid (Labidochromis) | 122 | 123 | 115 | 125 |

PALATABLE PET FOOD COMPOSITION

This application is a National Stage application of PCT/US2017/068982, filed Dec. 29, 2017 which application is hereby incorporated by reference in its entireties. To the extent appropriate, a claim of priority is made to each of the above disclosed application.

TECHNICAL FIELD OF THE INVENTION

The invention relates to a pet food composition comprising at least one natural antioxidant and at least one synthetic antioxidant and at least one acidity regulator component to regulate the pH, wherein the pet food composition does not contain 1,2-dihydro-6-ethoxy-2,2,4-trimethylquinoline. Further, the invention comprises a method of producing the pet food composition as well as the use of the pet food composition.

BACKGROUND ART

An essential component of animal feeds is unsaturated fatty acids, e.g. n-3 and n-6 fatty acids. Thus, animal feeds are in general susceptible to lipid oxidation. Lipid oxidation is initiated when a free radical ($X^-$, $OH^-$ or others) abstracts a 20 hydrogen atom from polyunsaturated fatty acids (PUFA). A peroxyl radical is then formed due to the reaction of the PUFA radical with oxygen. This continues when the lipid peroxyl radical abstracts a hydrogen atom from a new PUFA (Holmer, 1993).

To prolong the stability of the diet and the dietary components, stabilizing 25 agents are often applied, which prevent the transmission of electrons of dietary components of the diet and thus obviate their spoilage. Those stabilizing agents act as electron donors and thus protect the highly reactive percentage of ingredients of the dietary components (such as unsaturated fats, vitamins, carotenoids etc.), which are mainly essential nutrients for the target species. Further, the electron donors 30 contribute to the security of lipid stability, to the prevention of toxic reaction products (peroxide) and they contribute to a long stability of the diet. Application of such electron donors is carried out in the dietary components such as fats and oils or directly into the diet. A highly effective electron donor is 1,2-dihydro-6-ethoxy-2,2,4-trimethylquinoline (ethoxyquin).

Especially spoiled lipids, which have a very bad taste and smell, often lead to the target species refusing the diet. In a spoiled diet corrupted by disintegrated lipids, vitamins such as vitamin A and E are destroyed by aggressive atoms or molecules with at least one unpaired valence electrons. In the presence of breakdown products, pathological phenomena and toxic effects can also occur in the target species.

In the course of the scientific re-evaluation in the EU, concerns regarding ethoxyquin with respect to the safety of consumer and animals were raised. Thus, the aim was to provide an adequate substitute for ethoxyquin in view of pet food.

In a study at the Bavarian State Institute for Agriculture, Institute for Fisheries (annual report 2004, experiments with rosemary extract as antioxidant in diets for rainbow trout) experiments with a natural antioxidant such as rosemary extract as an electron donor were tested in a diet for salmonids. In the experiment, it was found that rosemary extract as a natural antioxidant results in reduced food intake in comparison to the diet without the natural components.

Thus, the prior art teaches that rosemary extract as a natural antioxidant alone is not sufficient to increase the food intake in the target species.

Thus, there is a need in the art for other adequate components, preferably substituting ethoxyquin.

Therefore, the objective of the invention is to comply with this need.

The solution of the invention is described in the following, exemplified in the appended examples, illustrated in the figures and reflected in the claims.

SUMMARY OF THE INVENTION

Surprisingly, it has now been found that the combination of one or more natural antioxidants and one or more synthetic antioxidants in combination with one or more additives to lower the pH value not only stabilizes and prevents lipid spoilage in the diet, but also increases the acceptance and attractiveness of the diet in the target species synergistically by an intensification and reversal of the individual effects.

The invention comprises a pet food composition comprising i) at least one natural antioxidant, and ii) at least one synthetic antioxidant, and iii) at least one acidity regulator component to regulate the pH, wherein the pet food composition does preferably not contain 1,2-dihydro-6-ethoxy-2,2,4-trimethylquinoline.

Further, the invention may envisage the pet food composition, wherein the at least one natural antioxidant is selected from the group of tocopherol and/or ascorbic acid and/or plant extract.

The plant extract preferably comprises oregano, salvia and/or rosemary extract.

Additionally, the invention may envisage the pet food composition, wherein the at least one natural antioxidant is a combination of rosemary extract and tocopherol.

The ratio of rosemary extract to tocopherol may be 1:0.1 to 1:5.

The invention may encompass the pet food composition, wherein the at least one synthetic antioxidant is selected from the group consisting of butylhydroxyanisol, butylhydroxytoluol, propyl-3,4,5-trihydroxybenzoate, sulfur dioxide, sodium sulfite, sodium hydrogensulfite, sodium disulfite, potassium disulfite, calcium sulfite, calcium hydrogensulfite, potassium hydrogen sulfite, sodium L-ascorbate, calcium L-ascorbate, esters, octygallate, tertiary butylhydroquinone (TBHQ), citric acid salts, sodium citrate, potassium citrate, calcium disodium EDTA, diphosphates, disodium diphosphate, trisodium diphosphate, tetrasodium diphosphate, Diphosphate diphosphate, calcium diphosphate, triphosphates, pentasodium triphosphate, pentakalium triphosphate, polyphosphate, sodium polyphosphate, potassium polyphosphate, sodium calcium polyphosphate, calcium polyphosphate, tin-II-chloride.

The at least one synthetic antioxidant may be in the composition in an amount from 0.001% to 1.0% based on the crude fat content of the pet food composition.

Further, the invention may comprise the pet food composition, wherein the at least one acidity regulator component is selected from the group consisting of citric acid, formic acid, propanoic acid, lactic acid and sorbic acid.

The at least one acidity regulator component may be in the composition in an amount from 0.001% to 10% by weight of the composition.

The invention may envisage the pet food composition, wherein the pH is below 6.2.

The invention may comprise the pet food composition, wherein i) the at least one natural antioxidant is a combination of rosemary extract and tocopherol in a ratio of 1:0.1 to 1:5, ii) the at least one synthetic antioxidant is buthylhydroxytoluol and/or propyl-3,4,5-trihydroxybenzoate, and iii) the at least one acidity regulator component is citric acid.

The invention may comprise the pet food composition, further comprising a dietary component selected from the group consisting of a fat, an oil, a protein, a vitamin, a starch, a flavoring agent and a coloring agent.

The at least one natural antioxidant and the at least one synthetic antioxidant may be integrated homogeneously into a lipophilic matrix.

The invention envisages a method of producing a pet food composition, the method comprising a) mixing the additives of a pet food composition comprising i) at least one natural antioxidant, and ii) at least one synthetic antioxidant into a lipophilic matrix, b) mixing the at least one acidity regulator component to regulate the pH into a premix, c) applying the enriched lipophilic matrix of step a) and the enriched premix of step b) to a solid matrix before obtaining the pet food composition, d) obtaining the pet food composition.

The invention further encompasses the use of a pet food composition for improving the palatability of the pet food composition and/or for enhancing the weight in a healthy pet.

BRIEF DESCRIPTION OF THE FIGURES

FIG. 1: Weight increase (%/pisces) of aquatic subjects. The synergistic effect of the combination of synthetic and natural antioxidants in a specific ratio with the effect of a pH-lowering and thus acceptability-improving component (diet SNC), increases the weight of aquatic subjects (fish, e.g. Osteichthyes such as red phantom tetra and yellow cichlid) by up to 14% to the control diet without supplementation. The addition of natural antioxidants (diet NC) adversely affects the weight of the individual species by up to 6% compared to the control diet.

DETAILED DESCRIPTION OF THE INVENTION

The invention provides a pet food composition comprising i) at least one natural antioxidant, and ii) at least one synthetic antioxidant, and iii) at least one acidity regulator component to regulate the pH. Preferably, wherein the pet food composition does not contain 1,2-dihydro-6-ethoxy-2,2,4-trimethylquinoline.

The term "pet food composition" refers to a wet or dry food composition for pets, in particular for fish. It may be in the form of a moist food, semi-moist food, dry food, supplement or treat. The pet food composition may be in kibble form, flakes, pellets, sticks, granules, gelfood or tablets and the like. Preferably, the pet food composition is dry food. Preferably, the pet food composition is for fish.

The term "natural" means naturally occurring or occurring in the nature. Thus, natural antioxidants occur in the nature. Once the natural antioxidant is identified, it may be isolated from the nature or by biological and/or chemical means. Yet, if isolated by biological and/or chemical means, it does not change the origin of the natural antioxidant, which is natural.

As used herein, the term "antioxidant" is a substance that, when present in a mixture containing an oxidizable substrate or biological molecule, significantly delays or prevents oxidation of the substrate biological molecule. Antioxidants can act by scavenging biologically important reactive free radicals or other reactive oxygen species ($O_2^-$, $H_2O_2$, OH, HOCl, ferryl, peroxyl, peroxynitrite, and alkoxyl), or by preventing their formation, or by catalytically converting the free radical or other reactive oxygen species to a less reactive species. Relative antioxidant activity can be measured by cyclic voltammetry studies, where the voltage (x-axis) is an index of relative antioxidant activity. The voltage at which the first peak occurs is an indication of the voltage at which an electron is donated, which in turn is an index of antioxidant activity. An antioxidant may also be called (feed) additive, which is added to the pet food composition.

The at least one natural antioxidant may be selected from the group consisting of tocopherol, ascorbic acid, plant extract, and any combination thereof.

The at least one natural antioxidant may be selected from the group consisting of tocopherol(s) and/or ascorbic acid and/or plant extract(s). The at least one natural antioxidant may be tocopherol(s) and ascorbic acid and plant extract(s). The at least one natural antioxidant may be tocopherol(s) and ascorbic acid. The at least one natural antioxidant may be tocopherol(s) and plant extract(s). The at least one natural antioxidant may be tocopherol(s) or ascorbic acid or plant extract(s).

Tocopherols are a class of organic chemical compounds having vitamin E activity. The class consists of mainly β-, γ-, and δ, but also α-tocopherols, wherein each form has a different biological activity (Burton and Ingold 1981. *J. Am. Chem. Soc.* 103: 6472-6477). As a food additive, tocopherol is labelled with these E numbers: E306 (tocopherol), E307 (α-tocopherol), E308 (γ-tocopherol), and E309 (δ-tocopherol). These are all approved in the USA, EU and Australia and New Zealand for use as antioxidants. In the invention a mixture of tocopherols may be used. In particular, α-, β-, γ-, and δ tocopherols may be used, wherein the mixture may comprise >50% non α-tocopherols.

The term "ascorbic acid ($C_6H_8O_6$)" is an organic compound derived from a monosaccharide. It is highly soluble in water. Ascorbic acid refers to vitamin C and is used as a dietary supplement. In food industry it has been exploited for its antioxidant and stabilizing ability.

The term "plant extract" refers to a substance made by extracting a part of a raw plant material. Extraction may be achieved by using a solvent such as ethanol or water. Plant extracts may be used as tinctures or in powder form. In the invention (the) plant extract(s) may be used as a tincture or as a powder form.

Preferably, the plant extract comprises oregano, salvia and/or rosemary extract. The plant extract may comprise oregano extract and salvia extract and rosemary extract. The plant extract may comprise oregano extract or salvia extract or rosemary extract. The plant extract is oregano extract, preferably the plant extract is salvia extract and more preferably the plant extract is rosemary extract.

The inventors found that the at least one natural antioxidant is preferably a combination of rosemary extract and tocopherol(s).

The ratio of rosemary extract to tocopherol may be 1:0.1 to 1 to 1:5. Preferably, in the mixture the ratio of rosemary extract to tocopherol is 1:0.4 to 1:3, more preferably the ratio of rosemary extract to tocopherol is 1:1 to 1:1.3.

The dosage of the individual component (e.g., rosemary extract or tocopherol including carrier) or of the mixture (e.g., rosemary extract and tocopherol including carrier) is from 10 to 400 mg/kg diet, preferably from 20 to 200 mg/kg diet, more preferably from 70 to 95 mg/kg diet, such as 70, 71, 72, 73, 74, 75, 76, 77, 78, 79, 80, 81, 82, 83, 84, 85, 86, 87, 89, 90, 91, 92, 93, 94, or 95 mg/kg diet. If a mixture may be used, the ratio of the components (rosemary extract and tocopherol and carrier) to achieve a specific dosage is variable depending on the dosage of interest. In this context, the term "carrier" refers to a diluent, adjuvant, or vehicle with which the components may be administered. Carriers may be sterile liquids, such as water and oils including those of petroleum, animal, vegetable or synthetic origin, such as peanut oil, soybean oil, mineral oil, sesame oil and the like. Here, the carrier (e.g. water) and the natural antioxidants such as rosemary extract and tocopherol may form a solution.

The term "synthetic" means not naturally occurring, rather of pertaining to, proceeding by or involving synthesis. Synthetic antioxidants pertain to compounds/substances formed through a chemical process such as synthesis by human agency, as opposed to those of natural origin.

The at least one synthetic antioxidant may be selected from the group consisting of butylhydroxyanisol, buthylhydroxytoluol, propyl-3,4,5-trihydroxybenzoate, sulfur dioxide, sodium sulfite, sodium hydrogensulfite, sodium disulfite, potassium disulfite, calcium sulfite, calcium hydrogensulfite, potassium hydrogen sulfite, sodium L-ascorbate, calcium L-ascorbate, esters, octygallate, tertiary butylhydroquinone (TBHQ), citric acid salts, sodium citrate, potassium citrate, calcium disodium EDTA, diphosphates, disodium diphosphate, trisodium diphosphate, tetrasodium diphosphate, Diphosphate diphosphate, calcium diphosphate, triphosphates, pentasodium triphosphate, pentakalium triphosphate, polyphosphate, sodium polyphosphate, potassium polyphosphate, sodium calcium polyphosphate, calcium polyphosphate, tin-II-chloride, preferably the at least one synthetic antioxidant is buthylhydroxytoluol and/or propyl-3,4,5-trihydroxybenzoate. The at least one synthetic antioxidant may be buthylhydroxytoluol and propyl-3,4,5,-trihydroxybenzoate. The at least one synthetic antioxidant may be buthylhydroxytoluol or propyl-3,4,5,-trihydroxybenzoate. Also comprised by the invention may be the at least one synthetic antioxidant being butylhydroxyanisol and/or propyl-3,4,5-trihydroxybenzoate. Thus, the at least one synthetic antioxidant may be butylhydroxyanisol and propyl-3,4,5,-trihydroxybenzoate. The at least one synthetic antioxidant may be butylhydroxyanisol or propyl-3,4,5,-trihydroxybenzoate.

The term "buthylhydroxytoluol (BHT)" refers to an antioxidant and is a lipophilic organic compound, chemically a derivative of phenol. It is also called "dibutylhydroxytoluene". In the United States, it is classified as generally recognized as safe (GRAS) based on a National Cancer Institute study from 1979. In the European Union it is primarily used as an antioxidant food additive having the E number E321.

The term "buthylhydroxyanisol" refers to is an antioxidant consisting of a mixture of two isomeric organic compounds, namely 2-tert-butyl-4-hydroxyanisole and 3-tert-butyl-4-hydroxyanisole. It is a waxy solid and used as a food additive having the E number E320

The term "propyl-3,4,5-trihydroxybenzoate" refers to propyl gallate and is an ester formed by the condensation of gallic acid and propanol. Propyl gallate acts as an antioxidant and is added to foods, which contain fats and oils, to prevent oxidation. As a food additive, it is used under the E number E310.

The at least one synthetic antioxidant may be in the composition in an amount from 0.001% to 1.0% based on the crude fat content of the pet food composition. Preferably from 0.01 to 0.04% based on the crude fat content of the pet food composition, more preferably from 0.015 to 0.025% based on the crude fat content of the pet food composition, such as 0.015%, 0.016%, 0.017%, 0.018%, 0.019%, 0.020%, 0.021%, 0.022%, 0.023%, 0.024%, 0.025% based on the crude fat content of the pet food composition. As an example for a pet food composition with the at least one synthetic antioxidant in an amount of 0.02% based on the crude fat (raw fat) content of the pet food composition, 10 mg/kg synthetic antioxidant may be used for a pet food composition with 5% crude fat and 30 mg/kg synthetic antioxidant may be used for a pet food composition with 15% crude fat. The dosages (in an amount from 0.001% to 1.0%, or in an amount from 0.01 to 0.04%, preferably in an amount from 0.015 to 0.025%) may apply to a single synthetic antioxidant (e.g., buthylhydroxytoluol or propyl-3,4,5-trihydroxybenzoate) or it may apply to a mixture of synthetic antioxidants (e.g., such as buthylhydroxytoluol and propyl-3,4,5-trihydroxybenzoate). In this context, the mixture of the synthetic antioxidants may be based on the sum of the synthetic antioxidants.

The term "crude fat content of the pet food composition" is determined by general animal feed analysis such as the classical "Weender Futtermittelanalyse" as it is known to a person skilled in the art. The classical "Weender Futtermittelanalyse" comprises standard processes, being necessary to determine the nutritional value of the animal diet. Here, it is differentiated between crude ash which refers to anorganic substances and organic substances e.g., crude fibers (such as cellulose, pentosans and the like), crude proteins (such as peptides, amino acids and the like), crude fat (triglyceride, wax, carotene, oils and the like) and nitrogen-free substances.

The term "acidity regulator component" refers to a component which regulates the pH. In other words the component is a pH-lowering and thus acceptability-improving component. The at least one acidity regulator component may be used as an acceptance and attractiveness enhancer and weight enhancer. An acidity regulator component may also be called (feed) additive.

The at least one acidity regulator component may be selected from the group consisting of citric acid, formic acid, propanoic acid, lactic acid and sorbic acid. The at least one acidity regulator component may be citric acid and formic acid and propanoic acid and lactic acid and sorbic acid. The at least one acidity regulator component may be citric acid or formic acid or propanoic acid or lactic acid or sorbic acid. The at least one component may be citric acid and formic acid; or citric acid and propanoic acid; or citric acid and lactic acid; or citric acid and sorbic acid. Preferably, the at least one acidity regulator component is formic acid, more preferably the at least one acidity regulator component is lactic acid and most preferably the at least one acidity regulator component is citric acid.

The term "citric acid ($C_6H_8O_7$.)" is a weak organic tricarboxylic. It is an intermediate in the citric acid cycle or aerobic organism. It naturally occurs in citrus fruits. Citric acids and other acids such as formic, propanoic, lactic and sorbic acid and their salts and mixtures are usually added into the diets as preservatives in a very low dosage of about 0.005% to prevent microbiological spoilage. These preservatives also find in the lowest concentrations of from 0.0005 to 0.005% in commercial products for the prevention of the spoilage of lipids use.

The at least one acidity regulator component may be in the composition in an amount from 0.001% to 10% by weight of the composition. Preferably, the dosage of the component for lowering the pH value is in an amount from 0.01% to 1% by weight of the pet food composition and more preferably from 0.028% to 0.034% by weight of the pet food composition, such as 0.028%, 0.029%, 0.030%, 0.031%, 0.032%, 0.033% and 0.034% by weight of the pet food composition. In order to lower the pH of the pet food composition properly and to achieve an increased acceptance of the food in the target species, the amount (dosage) of the acidity regulator component may be higher than 0.005%, the usual dosage of the preservatives such as citric acid and other acids as for example formic acid, propanoic acid, lactic acid and sorbic acid as well as their salts and mixtures. In this context, the term "by weight", "percentage by weight" or "w/w %" refers to the weight of the final pet food composition.

During the application of the combination of at least one natural and at least one synthetic antioxidant, the synthetic and natural antioxidants need to be used in a very specific ratio in order to achieve the synergistic effect in combination with at least one acidity regulator component as stabilizing agents in the pet food composition. The ratio of synthetic (see [45]) vs natural antioxidants ([38]) in combination with additives (acidity regulator components) such as e.g. citric acid ([50]) may vary depending on the lipid content of the pet food composition.

Further, the pH of the pet food composition may be below 6.2. The term "below" means below or equal. Preferably, the pH is 6.2 or below 6.2, such as 6.1, 6.0, 5.9, 5.8, 5.7, 5.6, 5.5, 5.4, 5.3, 5.2, 5.1, 5.0, 4.9, 4.8, 4.7, 4.6, 4.5, 4.4, 4.3, 4.2, 4.1, 4.0, 3.9, 3.8, 3.7, 3.6, 3.5, 3.4, 3.3, 3.2, 3.1, 3.0.

The invention further comprises a pet food composition comprising i) at least one natural antioxidant, wherein the at least one natural antioxidant is selected from the group of tocopherol and/or ascorbic acid and/or plant extract and ii) at least one synthetic antioxidant, and iii) at least one acidity regulator component to regulate the pH, wherein the pet food composition does preferably not contain 1,2-dihydro-6-ethoxy-2,2,4-trimethylquinoline.

Further, the invention comprises a pet food composition comprising i) at least one natural antioxidant, wherein the at least one natural antioxidant is selected from the group of tocopherol and/or ascorbic acid and/or plant extract, wherein the plant extract comprises oregano, salvia and/or rosemary extract and ii) at least one synthetic antioxidant, and iii) at least one acidity regulator component to regulate the pH, wherein the pet food composition does preferably not contain 1,2-dihydro-6-ethoxy-2,2,4-trimethylquinoline.

Additionally, the invention comprises a pet food composition comprising i) at least one natural antioxidant, wherein the at least one natural antioxidant is a combination of rosemary extract and tocopherol and ii) at least one synthetic antioxidant, and iii) at least one acidity regulator component to regulate the pH, wherein the pet food composition does preferably not contain 1,2-dihydro-6-ethoxy-2,2,4-trimethylquinoline.

The invention encompasses a pet food composition comprising i) at least one natural antioxidant, wherein the at least one natural antioxidant is a combination of rosemary extract and tocopherol in a ratio of 1:0.1 to 1:5 and ii) at least one synthetic antioxidant, and iii) at least one acidity regulator component to regulate the pH, wherein the pet food composition does preferably not contain 1,2-dihydro-6-ethoxy-2,2,4-trimethylquinoline.

Additionally, the invention encompasses a pet food composition comprising i) at least one natural antioxidant, and ii) at least one synthetic antioxidant, wherein the at least one synthetic antioxidant is selected from the group consisting of buthylhydroxyanisol, buthylhydroxytoluol, propyl-3,4,5-trihydroxybenzoate, sulfur dioxide, sodium sulfite, sodium hydrogensulfite, sodium disulfite, potassium disulfite, calcium sulfite, calcium hydrogensulfite, potassium hydrogen sulfite, sodium L-ascorbate, calcium L-ascorbate, esters, octygallate, tertiary butylhydroquinone (TBHQ), citric acid salts, sodium citrate, potassium citrate, calcium disodium EDTA, diphosphates, disodium diphosphate, trisodium diphosphate, tetrasodium diphosphate, Diphosphate diphosphate, calcium diphosphate, triphosphates, pentasodium triphosphate, pentakalium triphosphate, polyphosphate, sodium polyphosphate, potassium polyphosphate, sodium calcium polyphosphate, calcium polyphosphate, tin-II-chloride, and iii) at least one acidity regulator component to regulate the pH, wherein the pet food composition does preferably not contain 1,2-dihydro-6-ethoxy-2,2,4-trimethylquinoline.

The invention further comprises a pet food composition comprising i) at least one natural antioxidant, and ii) at least one synthetic antioxidant, wherein the at least one synthetic antioxidant is in the composition in an amount from 0.001% to 1.0% based on the crude fat content of the pet food composition and iii) at least one acidity regulator component to regulate the pH, wherein the pet food composition does preferably not contain 1,2-dihydro-6-ethoxy-2,2,4-trimethylquinoline.

The invention further comprises a pet food composition comprising i) at least one natural antioxidant, and ii) at least one synthetic antioxidant, wherein the at least one synthetic antioxidant is buthylhydroxytoluol and/or propyl-3,4,5-trihydroxybenzoate and iii) at least one acidity regulator component to regulate the pH, wherein the pet food composition does preferably not contain 1,2-dihydro-6-ethoxy-2,2,4-trimethylquinoline.

The invention further comprises a pet food composition comprising i) at least one natural antioxidant, and ii) at least one synthetic antioxidant, wherein the at least one synthetic antioxidant is buthylhydroxyanisol and/or propyl-3,4,5-trihydroxybenzoate and iii) at least one acidity regulator component to regulate the pH, wherein the pet food composition does preferably not contain 1,2-dihydro-6-ethoxy-2,2,4-trimethylquinoline.

The invention envisages a pet food composition comprising i) at least one natural antioxidant, wherein the at least one natural antioxidant is selected from the group of tocopherol and/or ascorbic acid and/or a plant extract, and ii) at least one synthetic antioxidant, wherein the at least one synthetic antioxidant is selected from the group consisting of buthylhydroxyanisol, buthylhydroxytoluol, propyl-3,4,5-trihydroxybenzoate, sulfur dioxide, sodium sulfite, sodium hydrogensulfite, sodium disulfite, potassium disulfite, calcium sulfite, calcium hydrogensulfite, potassium hydrogen sulfite, sodium L-ascorbate, calcium L-ascorbate, esters, octygallate, tertiary butylhydroquinone (TBHQ), citric acid salts, sodium citrate, potassium citrate, calcium disodium EDTA, diphosphates, disodium diphosphate, trisodium diphosphate, tetrasodium diphosphate, Diphosphate diphosphate, calcium diphosphate, triphosphates, pentasodium triphosphate, pentakalium triphosphate, polyphosphate, sodium polyphosphate, potassium polyphosphate, sodium calcium polyphosphate, calcium polyphosphate, tin-II-chloride, and iii) at least one acidity regulator component to regulate the pH, wherein the pet food composition does preferably not contain 1,2-dihydro-6-ethoxy-2,2,4-trimethylquinoline.

The invention envisages a pet food composition comprising i) at least one natural antioxidant, wherein the at least one natural antioxidant is selected from the group of tocopherol and/or ascorbic acid and/or a plant extract, wherein the plant extract comprises oregano, salvia and/or rosemary extract and ii) at least one synthetic antioxidant, wherein the at least one synthetic antioxidant is selected from the group consisting of buthylhydroxyanisol, buthylhydroxytoluol, propyl-3,4,5-trihydroxybenzoate, sulfur dioxide, sodium sulfite, sodium hydrogensulfite, sodium disulfite, potassium disulfite, calcium sulfite, calcium hydrogensulfite, potassium hydrogen sulfite, sodium L-ascorbate, calcium L-ascorbate, esters, octygallate, tertiary butylhydroquinone (TBHQ), citric acid salts, sodium citrate, potassium citrate, calcium disodium EDTA, diphosphates, disodium diphosphate, trisodium diphosphate, tetrasodium diphosphate, Diphosphate diphosphate, calcium diphosphate, triphosphates, pentasodium triphosphate, pentakalium triphosphate, polyphosphate, sodium polyphosphate, potassium polyphosphate, sodium calcium polyphosphate, calcium polyphosphate, tin-II-chloride, and iii) at least one acidity regulator component to regulate the pH, wherein the pet food composition does preferably not contain 1,2-dihydro-6-ethoxy-2,2,4-trimethylquinoline.

The invention envisages a pet food composition comprising i) at least one natural antioxidant, wherein the at least one natural antioxidant is a combination of rosemary extract and tocopherol, and ii) at least one synthetic antioxidant, wherein the at least one synthetic antioxidant is selected from the group consisting of buthylhydroxyanisol, buthylhydroxytoluol, propyl-3,4,5-trihydroxybenzoate, sulfur dioxide, sodium sulfite, sodium hydrogensulfite, sodium disulfite, potassium disulfite, calcium sulfite, calcium hydrogensulfite, potassium hydrogen sulfite, sodium L-ascorbate, calcium L-ascorbate, esters, octygallate, tertiary butylhydroquinone (TBHQ), citric acid salts, sodium citrate, potassium citrate, calcium disodium EDTA, diphosphates, disodium diphosphate, trisodium diphosphate, tetrasodium diphosphate, Diphosphate diphosphate, calcium diphosphate, triphosphates, pentasodium triphosphate, pentakalium triphosphate, polyphosphate, sodium polyphosphate, potassium polyphosphate, sodium calcium polyphosphate, calcium polyphosphate, tin-II-chloride, and iii) at least one acidity regulator component to regulate the pH, wherein the pet food composition does preferably not contain 1,2-dihydro-6-ethoxy-2,2,4-trimethylquinoline.

The invention encompasses a pet food composition comprising i) at least one natural antioxidant, wherein the at least one natural antioxidant is a combination of rosemary extract and tocopherol in a ratio of 1:0.1 to 1:5, and ii) at least one synthetic antioxidant, wherein the at least one synthetic antioxidant is selected from the group consisting of buthylhydroxyanisol, buthylhydroxytoluol, propyl-3,4,5-trihydroxybenzoate, sulfur dioxide, sodium sulfite, sodium hydrogensulfite, sodium disulfite, potassium disulfite, calcium sulfite, calcium hydrogensulfite, potassium hydrogen sulfite, sodium L-ascorbate, calcium L-ascorbate, esters, octygallate, tertiary butylhydroquinone (TBHQ), citric acid salts, sodium citrate, potassium citrate, calcium disodium EDTA, diphosphates, disodium diphosphate, trisodium diphosphate, tetrasodium diphosphate, Diphosphate diphosphate, calcium diphosphate, triphosphates, pentasodium triphosphate, pentakalium triphosphate, polyphosphate, sodium polyphosphate, potassium polyphosphate, sodium calcium polyphosphate, calcium polyphosphate, tin-II-chloride, and iii) at least one acidity regulator component to regulate the pH, wherein the pet food composition does preferably not contain 1,2-dihydro-6-ethoxy-2,2,4-trimethylquinoline.

The invention envisages a pet food composition comprising i) at least one natural antioxidant, wherein the at least one natural antioxidant is selected from the group of tocopherol and/or ascorbic acid and/or a plant extract, and ii) at least one synthetic antioxidant, wherein the at least one synthetic antioxidant is in the composition in an amount from 0.001% to 1.0% based on the crude fat content of the pet food composition, and iii) at least one acidity regulator component to regulate the pH, wherein the pet food composition does preferably not contain 1,2-dihydro-6-ethoxy-2,2,4-trimethylquinoline.

The invention comprises a pet food composition comprising i) at least one natural antioxidant, wherein the at least one natural antioxidant is selected from the group of tocopherol and/or ascorbic acid and/or a plant extract, wherein the plant extract comprises oregano, salvia and/or rosemary extract and ii) at least one synthetic antioxidant, wherein the at least one synthetic antioxidant is in the composition in an amount from 0.001% to 1.0% based on the crude fat content of the pet food composition, and iii) at least one acidity regulator component to regulate the pH, wherein the pet food composition does preferably not contain 1,2-dihydro-6-ethoxy-2,2,4-trimethylquinoline.

The invention envisages a pet food composition comprising i) at least one natural antioxidant, wherein the at least one natural antioxidant is a combination of rosemary extract and tocopherol and ii) at least one synthetic antioxidant, wherein the at least one synthetic antioxidant is in the composition in an amount from 0.001% to 1.0% based on the crude fat content of the pet food composition, and iii) at least one acidity regulator component to regulate the pH, wherein the pet food composition does preferably not contain 1,2-dihydro-6-ethoxy-2,2,4-trimethylquinoline.

The invention encompasses a pet food composition comprising i) at least one natural antioxidant, wherein the at least one natural antioxidant is a combination of rosemary extract and tocopherol in a ratio of 1:0.1 to 1:5 and ii) at least one synthetic antioxidant, wherein the at least one synthetic antioxidant is in the composition in an amount from 0.001% to 1.0% based on the crude fat content of the pet food composition, and iii) at least one acidity regulator component to regulate the pH, wherein the pet food composition does preferably not contain 1,2-dihydro-6-ethoxy-2,2,4-trimethylquinoline.

The invention envisages a pet food composition comprising i) at least one natural antioxidant, wherein the at least one natural antioxidant is selected from the group of tocopherol and/or ascorbic acid and/or a plant extract, and ii) at least one synthetic antioxidant, wherein the at least one synthetic antioxidant is buthylhydroxytoluol and/or propyl-3,4,5-trihydroxybenzoate, and iii) at least one acidity regulator component to regulate the pH, wherein the pet food composition does preferably not contain 1,2-dihydro-6-ethoxy-2,2,4-trimethylquinoline.

The invention comprises a pet food composition comprising i) at least one natural antioxidant, wherein the at least one natural antioxidant is selected from the group of tocopherol and/or ascorbic acid and/or a plant extract, wherein the plant extract comprises oregano, salvia and/or rosemary extract and ii) at least one synthetic antioxidant, wherein the at least one synthetic antioxidant is buthylhydroxytoluol and/or propyl-3,4,5-trihydroxybenzoate, and iii) at least one acidity regulator component to regulate the pH, wherein the pet food composition does preferably not contain 1,2-dihydro-6-ethoxy-2,2,4-trimethylquinoline.

The invention comprises a pet food composition comprising i) at least one natural antioxidant, wherein the at least one natural antioxidant is a combination of rosemary extract and tocopherol, and ii) at least one synthetic antioxidant, wherein the at least one synthetic antioxidant is buthylhydroxytoluol and/or propyl-3,4,5-trihydroxybenzoate, and iii) at least one acidity regulator component to regulate the pH, wherein the pet food composition does preferably not contain 1,2-dihydro-6-ethoxy-2,2,4-trimethylquinoline.

The invention comprises a pet food composition comprising i) at least one natural antioxidant, wherein the at least one natural antioxidant is a combination of rosemary extract and tocopherol in a ratio of 1:0.1 to 1:5, and ii) at least one synthetic antioxidant, wherein the at least one synthetic antioxidant is buthylhydroxytoluol and/or propyl-3,4,5-trihydroxybenzoate, and iii) at least one acidity regulator component to regulate the pH, wherein the pet food composition does preferably not contain 1,2-dihydro-6-ethoxy-2,2,4-trimethylquinoline.

The invention envisages a pet food composition comprising i) at least one natural antioxidant, wherein the at least one natural antioxidant is selected from the group of tocopherol and/or ascorbic acid and/or a plant extract, and ii) at least one synthetic antioxidant, wherein the at least one synthetic antioxidant is buthylhydroxyanisol and/or propyl-3,4,5-trihydroxybenzoate, and iii) at least one acidity regulator component to regulate the pH, wherein the pet food composition does preferably not contain 1,2-dihydro-6-ethoxy-2,2,4-trimethylquinoline.

The invention comprises a pet food composition comprising i) at least one natural antioxidant, wherein the at least one natural antioxidant is selected from the group of tocopherol and/or ascorbic acid and/or a plant extract, wherein the plant extract comprises oregano, salvia and/or rosemary extract and ii) at least one synthetic antioxidant, wherein the at least one synthetic antioxidant is buthylhydroxyanisol and/or propyl-3,4,5-trihydroxybenzoate, and iii) at least one acidity regulator component to regulate the pH, wherein the pet food composition does preferably not contain 1,2-dihydro-6-ethoxy-2,2,4-trimethylquinoline.

The invention comprises a pet food composition comprising i) at least one natural antioxidant, wherein the at least one natural antioxidant is a combination of rosemary extract and tocopherol, and ii) at least one synthetic antioxidant, wherein the at least one synthetic antioxidant is buthylhydroxyanisol and/or propyl-3,4,5-trihydroxybenzoate, and iii) at least one acidity regulator component to regulate the pH, wherein the pet food composition does preferably not contain 1,2-dihydro-6-ethoxy-2,2,4-trimethylquinoline.

The invention comprises a pet food composition comprising i) at least one natural antioxidant, wherein the at least one natural antioxidant is a combination of rosemary extract and tocopherol in a ratio of 1:0.1 to 1:5, and ii) at least one synthetic antioxidant, wherein the at least one synthetic antioxidant is buthylhydroxyanisol and/or propyl-3,4,5-trihydroxybenzoate, and iii) at least one acidity regulator component to regulate the pH, wherein the pet food composition does preferably not contain 1,2-dihydro-6-ethoxy-2,2,4-trimethylquinoline.

The invention envisages a pet food composition comprising i) at least one natural antioxidant, and ii) at least one synthetic antioxidant, and iii) at least one acidity regulator component to regulate the pH, wherein the at least one acidity regulator component is selected from the group consisting of citric acid, formic acid, propanoic acid, lactic acid and sorbic acid, wherein the pet food composition does preferably not contain 1,2-dihydro-6-ethoxy-2,2,4-trimethylquinoline.

The invention envisages a pet food composition comprising i) at least one natural antioxidant, and ii) at least one synthetic antioxidant, and iii) at least one acidity regulator component to regulate the pH, wherein the at least one acidity regulator component is in the composition in an amount from 0.001% to 10%, wherein the pet food composition does preferably not contain 1,2-dihydro-6-ethoxy-2,2,4-trimethylquinoline.

The invention envisages a pet food composition comprising i) at least one natural antioxidant, and ii) at least one synthetic antioxidant, and iii) at least one acidity regulator component to regulate the pH, wherein the at least one acidity regulator component is citric acid, wherein the pet food composition does preferably not contain 1,2-dihydro-6-ethoxy-2,2,4-trimethylquinoline.

The invention envisages a pet food composition comprising i) at least one natural antioxidant, wherein the at least one natural antioxidant is selected from the group of tocopherol and/or ascorbic acid and/or a plant extract, and ii) at least one synthetic antioxidant, and iii) at least one acidity regulator component to regulate the pH, wherein the at least one acidity regulator component is selected from the group consisting of citric acid, formic acid, propanoic acid, lactic acid and sorbic acid, wherein the pet food composition does preferably not contain 1,2-dihydro-6-ethoxy-2,2,4-trimethylquinoline.

The invention envisages a pet food composition comprising i) at least one natural antioxidant, wherein the at least one natural antioxidant is selected from the group of tocopherol and/or ascorbic acid and/or a plant extract, wherein the plant extract comprises oregano, salvia and/or rosemary extract and ii) at least one synthetic antioxidant, and iii) at least one acidity regulator component to regulate the pH, wherein the at least one acidity regulator component is selected from the group consisting of citric acid, formic acid, propanoic acid, lactic acid and sorbic acid, wherein the pet food composition does preferably not contain 1,2-dihydro-6-ethoxy-2,2,4-trimethylquinoline.

The invention envisages a pet food composition comprising i) at least one natural antioxidant, wherein the at least one natural antioxidant is a combination of rosemary extract and tocopherol, and ii) at least one synthetic antioxidant, and iii) at least one acidity regulator component to regulate the pH, wherein the at least one acidity regulator component is selected from the group consisting of citric acid, formic acid, propanoic acid, lactic acid and sorbic acid, wherein the pet food composition does preferably not contain 1,2-dihydro-6-ethoxy-2,2,4-trimethylquinoline.

The invention encompasses a pet food composition comprising i) at least one natural antioxidant, wherein the at least one natural antioxidant is a combination of rosemary extract and tocopherol in a ratio of 1:0.1 to 1:5, and ii) at least one synthetic antioxidant, and iii) at least one acidity regulator component to regulate the pH, wherein the at least one acidity regulator component is selected from the group consisting of citric acid, formic acid, propanoic acid, lactic acid and sorbic acid, wherein the pet food composition does preferably not contain 1,2-dihydro-6-ethoxy-2,2,4-trimethylquinoline.

The invention envisages a pet food composition comprising i) at least one natural antioxidant, wherein the at least one natural antioxidant is selected from the group of tocopherol and/or ascorbic acid and/or a plant extract, and ii) at least one synthetic antioxidant, and iii) at least one acidity regulator component to regulate the pH, wherein the at least one acidity regulator component is in the composition in an amount from 0.001% to 10%, wherein the pet food composition does preferably not contain 1,2-dihydro-6-ethoxy-2,2,4-trimethylquinoline.

The invention envisages a pet food composition comprising i) at least one natural antioxidant, wherein the at least one natural antioxidant is selected from the group of tocopherol and/or ascorbic acid and/or a plant extract, wherein the plant extract comprises oregano, salvia and/or rosemary extract and ii) at least one synthetic antioxidant, and iii) at least one acidity regulator component to regulate the pH, wherein the at least one acidity regulator component is in the composition in an amount from 0.001% to 10%, wherein the pet food composition does preferably not contain 1,2-dihydro-6-ethoxy-2,2,4-trimethylquinoline.

The invention envisages a pet food composition comprising i) at least one natural antioxidant, wherein the at least one natural antioxidant is a combination of rosemary extract and tocopherol, and ii) at least one synthetic antioxidant, and iii) at least one acidity regulator component to regulate the pH, wherein the at least one acidity regulator component is in the composition in an amount from 0.001% to 10%, wherein the pet food composition does preferably not contain 1,2-dihydro-6-ethoxy-2,2,4-trimethylquinoline.

The invention encompasses a pet food composition comprising i) at least one natural antioxidant, wherein the at least one natural antioxidant is a combination of rosemary extract and tocopherol in a ratio of 1:0.1 to 1:5, and ii) at least one synthetic antioxidant, and iii) at least one acidity regulator component to regulate the pH, wherein the at least one acidity regulator component is in the composition in an amount from 0.001% to 10%, wherein the pet food composition does preferably not contain 1,2-dihydro-6-ethoxy-2,2,4-trimethylquinoline.

The invention envisages a pet food composition comprising i) at least one natural antioxidant, wherein the at least one natural antioxidant is selected from the group of tocopherol and/or ascorbic acid and/or a plant extract, and ii) at least one synthetic antioxidant, and iii) at least one acidity regulator component to regulate the pH, wherein the at least one acidity regulator component is citric acid, wherein the pet food composition does preferably not contain 1,2-dihydro-6-ethoxy-2,2,4-trimethylquinoline.

The invention envisages a pet food composition comprising i) at least one natural antioxidant, wherein the at least one natural antioxidant is selected from the group of tocopherol and/or ascorbic acid and/or a plant extract, wherein the plant extract comprises oregano, salvia and/or rosemary extract and ii) at least one synthetic antioxidant, and iii) at least one acidity regulator component to regulate the pH, wherein the at least one acidity regulator component is citric acid, wherein the pet food composition does preferably not contain 1,2-dihydro-6-ethoxy-2,2,4-trimethylquinoline.

The invention envisages a pet food composition comprising i) at least one natural antioxidant, wherein the at least one natural antioxidant is a combination of rosemary extract and tocopherol, and ii) at least one synthetic antioxidant, and iii) at least one acidity regulator component to regulate the pH, wherein the at least one acidity regulator component is citric acid, wherein the pet food composition does preferably not contain 1,2-dihydro-6-ethoxy-2,2,4-trimethylquinoline.

The invention encompasses a pet food composition comprising i) at least one natural antioxidant, wherein the at least one natural antioxidant is a combination of rosemary extract and tocopherol in a ratio of 1:0.1 to 1:5, and ii) at least one synthetic antioxidant, and iii) at least one acidity regulator component to regulate the pH, wherein the at least one acidity regulator component is citric acid, wherein the pet food composition does preferably not contain 1,2-dihydro-6-ethoxy-2,2,4-trimethylquinoline.

The invention envisages a pet food composition comprising i) at least one natural antioxidant, wherein the at least one natural antioxidant is selected from the group of tocopherol and/or ascorbic acid and/or a plant extract, and ii) at least one synthetic antioxidant, wherein the at least one synthetic antioxidant is selected from the group consisting of buthylhydroxyanisol, buthylhydroxytoluol, propyl-3,4,5-trihydroxybenzoate, sulfur dioxide, sodium sulfite, sodium hydrogensulfite, sodium disulfite, potassium disulfite, calcium sulfite, calcium hydrogensulfite, potassium hydrogen sulfite, sodium L-ascorbate, calcium L-ascorbate, esters, octygallate, tertiary butylhydroquinone (TBHQ), citric acid salts, sodium citrate, potassium citrate, calcium disodium EDTA, diphosphates, disodium diphosphate, trisodium diphosphate, tetrasodium diphosphate, Diphosphate diphosphate, calcium diphosphate, triphosphates, pentasodium triphosphate, pentakalium triphosphate, polyphosphate, sodium polyphosphate, potassium polyphosphate, sodium calcium polyphosphate, calcium polyphosphate, tin-II-chloride and iii) at least one acidity regulator component to regulate the pH, wherein the at least one acidity regulator component is selected from the group consisting of citric acid, formic acid, propanoic acid, lactic acid and sorbic acid, wherein the pet food composition does preferably not contain 1,2-dihydro-6-ethoxy-2,2,4-trimethylquinoline.

The invention envisages a pet food composition comprising i) at least one natural antioxidant, wherein the at least one natural antioxidant is selected from the group of tocopherol and/or ascorbic acid and/or a plant extract, wherein the plant extract comprises oregano, salvia and/or rosemary extract and ii) at least one synthetic antioxidant, wherein the at least one synthetic antioxidant is selected from the group consisting of buthylhydroxyanisol, buthylhydroxytoluol, propyl-3,4,5-trihydroxybenzoate, sulfur dioxide, sodium sulfite, sodium hydrogensulfite, sodium disulfite, potassium disulfite, calcium sulfite, calcium hydrogensulfite, potassium hydrogen sulfite, sodium L-ascorbate, calcium L-ascorbate, esters, octygallate, tertiary butylhydroquinone (TBHQ), citric acid salts, sodium citrate, potassium citrate, calcium disodium EDTA, diphosphates, disodium diphosphate, trisodium diphosphate, tetrasodium diphosphate, Diphosphate diphosphate, calcium diphosphate, triphosphates, pentasodium triphosphate, pentakalium triphosphate, polyphosphate, sodium polyphosphate, potassium polyphosphate, sodium calcium polyphosphate, calcium polyphosphate, tin-II-chloride, and iii) at least one acidity regulator component to regulate the pH, wherein the at least one acidity regulator component is selected from the group consisting of citric acid, formic acid, propanoic acid, lactic acid and sorbic acid, wherein the pet food composition does preferably not contain 1,2-dihydro-6-ethoxy-2,2,4-trimethylquinoline.

The invention envisages a pet food composition comprising i) at least one natural antioxidant, wherein the at least one natural antioxidant is a combination of rosemary extract and tocopherol, and ii) at least one synthetic antioxidant, wherein the at least one synthetic antioxidant is selected from the group consisting of buthylhydroxyanisol, buthylhydroxytoluol, propyl-3,4,5-trihydroxybenzoate, sulfur dioxide, sodium sulfite, sodium hydrogensulfite, sodium disulfite, potassium disulfite, calcium sulfite, calcium hydrogensulfite, potassium hydrogen sulfite, sodium L-ascorbate, calcium L-ascorbate, esters, octygallate, tertiary butylhydroquinone (TBHQ), citric acid salts, sodium citrate, potassium citrate, calcium disodium EDTA, diphosphates, disodium diphosphate, trisodium diphosphate, tetrasodium diphosphate, Diphosphate diphosphate, calcium diphosphate, triphosphates, pentasodium triphosphate, pentakalium triphosphate, polyphosphate, sodium polyphosphate, potassium polyphosphate, sodium calcium polyphosphate, calcium polyphosphate, tin-II-chloride, and iii) at least one acidity regulator component to regulate the pH, wherein the at least one acidity regulator component is selected from the group consisting of citric acid, formic acid, propanoic acid, lactic acid and sorbic acid, wherein the pet food composition does preferably not contain 1,2-dihydro-6-ethoxy-2,2,4-trimethylquinoline.

The invention encompasses a pet food composition comprising i) at least one natural antioxidant, wherein the at least one natural antioxidant is a combination of rosemary extract and tocopherol in a ratio of 1:0.1 to 1:5, and ii) at least one synthetic antioxidant, wherein the at least one synthetic antioxidant is selected from the group consisting of buthylhydroxyanisol, buthylhydroxytoluol, propyl-3,4,5-trihydroxybenzoate, sulfur dioxide, sodium sulfite, sodium hydrogensulfite, sodium disulfite, potassium disulfite, calcium sulfite, calcium hydrogensulfite, potassium hydrogen sulfite, sodium L-ascorbate, calcium L-ascorbate, esters, octygallate, tertiary butylhydroquinone (TBHQ), citric acid salts, sodium citrate, potassium citrate, calcium disodium EDTA, diphosphates, disodium diphosphate, trisodium diphosphate, tetrasodium diphosphate, Diphosphate diphosphate, calcium diphosphate, triphosphates, pentasodium triphosphate, pentakalium triphosphate, polyphosphate, sodium polyphosphate, potassium polyphosphate, sodium calcium polyphosphate, calcium polyphosphate, tin-II-chloride, and iii) at least one acidity regulator component to regulate the pH, wherein the at least one acidity regulator component is selected from the group consisting of citric acid, formic acid, propanoic acid, lactic acid and sorbic acid, wherein the pet food composition does preferably not contain 1,2-dihydro-6-ethoxy-2,2,4-trimethylquinoline.

The invention envisages a pet food composition comprising i) at least one natural antioxidant, wherein the at least one natural antioxidant is selected from the group of tocopherol and/or ascorbic acid and/or a plant extract, and ii) at least one synthetic antioxidant, wherein the at least one synthetic antioxidant is selected from the group consisting of buthylhydroxyanisol, buthylhydroxytoluol, propyl-3,4,5-trihydroxybenzoate, sulfur dioxide, sodium sulfite, sodium hydrogensulfite, sodium disulfite, potassium disulfite, calcium sulfite, calcium hydrogensulfite, potassium hydrogen sulfite, sodium L-ascorbate, calcium L-ascorbate, esters, octygallate, tertiary butylhydroquinone (TBHQ), citric acid salts, sodium citrate, potassium citrate, calcium disodium EDTA, diphosphates, disodium diphosphate, trisodium diphosphate, tetrasodium diphosphate, Diphosphate diphosphate, calcium diphosphate, triphosphates, pentasodium triphosphate, pentakalium triphosphate, polyphosphate, sodium polyphosphate, potassium polyphosphate, sodium calcium polyphosphate, calcium polyphosphate, tin-II-chloride, and iii) at least one acidity regulator component to regulate the pH, wherein the at least one acidity regulator component is in the composition in an amount from 0.001% to 10% by weight of the composition, wherein the pet food composition does preferably not contain 1,2-dihydro-6-ethoxy-2,2,4-trimethylquinoline.

The invention envisages a pet food composition comprising i) at least one natural antioxidant, wherein the at least one natural antioxidant is selected from the group of tocopherol and/or ascorbic acid and/or a plant extract, wherein the plant extract comprises oregano, salvia and/or rosemary extract and ii) at least one synthetic antioxidant, wherein the at least one synthetic antioxidant is selected from the group consisting of buthylhydroxyanisol, buthylhydroxytoluol, propyl-3,4,5-trihydroxybenzoate, sulfur dioxide, sodium sulfite, sodium hydrogensulfite, sodium disulfite, potassium disulfite, calcium sulfite, calcium hydrogensulfite, potassium hydrogen sulfite, sodium L-ascorbate, calcium L-ascorbate, esters, octygallate, tertiary butylhydroquinone (TBHQ), citric acid salts, sodium citrate, potassium citrate, calcium disodium EDTA, diphosphates, disodium diphosphate, trisodium diphosphate, tetrasodium diphosphate, Diphosphate diphosphate, calcium diphosphate, triphosphates, pentasodium triphosphate, pentakalium triphosphate, polyphosphate, sodium polyphosphate, potassium polyphosphate, sodium calcium polyphosphate, calcium polyphosphate, tin-II-chloride, and iii) at least one acidity regulator component to regulate the pH, wherein the at least one acidity regulator component is in the composition in an amount from 0.001% to 10% by weight of the composition, wherein the pet food composition does preferably not contain 1,2-dihydro-6-ethoxy-2,2,4-trimethylquinoline.

The invention envisages a pet food composition comprising i) at least one natural antioxidant, wherein the at least one natural antioxidant is a combination of rosemary extract and tocopherol, and ii) at least one synthetic antioxidant, wherein the at least one synthetic antioxidant is selected from the group consisting of buthylhydroxyanisol, buthylhydroxytoluol, propyl-3,4,5-trihydroxybenzoate, sulfur dioxide, sodium sulfite, sodium hydrogensulfite, sodium disulfite, potassium disulfite, calcium sulfite, calcium hydrogensulfite, potassium hydrogen sulfite, sodium L-ascorbate, calcium L-ascorbate, esters, octygallate, tertiary butylhydroquinone (TBHQ), citric acid salts, sodium citrate, potassium citrate, calcium disodium EDTA, diphosphates, disodium diphosphate, trisodium diphosphate, tetrasodium diphosphate, Diphosphate diphosphate, calcium diphosphate, triphosphates, pentasodium triphosphate, pentakalium triphosphate, polyphosphate, sodium polyphosphate, potassium polyphosphate, sodium calcium polyphosphate, calcium polyphosphate, tin-II-chloride, and iii) at least one acidity regulator component to regulate the pH, wherein the at least one acidity regulator component is in the composition in an amount from 0.001% to 10% by weight of the composition, wherein the pet food composition does preferably not contain 1,2-dihydro-6-ethoxy-2,2,4-trimethylquinoline.

The invention encompasses a pet food composition comprising i) at least one natural antioxidant, wherein the at least one natural antioxidant is a combination of rosemary extract and tocopherol in a ratio of 1:0.1 to 1:5, and ii) at least one synthetic antioxidant, wherein the at least one synthetic antioxidant is selected from the group consisting of buthylhydroxyanisol, buthylhydroxytoluol, propyl-3,4,5-trihydroxybenzoate, sulfur dioxide, sodium sulfite, sodium hydrogensulfite, sodium disulfite, potassium disulfite, calcium sulfite, calcium hydrogensulfite, potassium hydrogen sulfite, sodium L-ascorbate, calcium L-ascorbate, esters, octygallate, tertiary butylhydroquinone (TBHQ), citric acid salts, sodium citrate, potassium citrate, calcium disodium EDTA, diphosphates, disodium diphosphate, trisodium diphosphate, tetrasodium diphosphate, Diphosphate diphosphate, calcium diphosphate, triphosphates, pentasodium triphosphate, pentakalium triphosphate, polyphosphate, sodium polyphosphate, potassium polyphosphate, sodium calcium polyphosphate, calcium polyphosphate, tin-II-chloride, and iii) at least one acidity regulator component to regulate the pH, wherein the at least one acidity regulator component is in the composition in an amount from 0.001% to 10% by weight of the composition, wherein the pet food composition does preferably not contain 1,2-dihydro-6-ethoxy-2,2,4-trimethylquinoline.

The invention envisages a pet food composition comprising i) at least one natural antioxidant, wherein the at least one natural antioxidant is selected from the group of tocopherol and/or ascorbic acid and/or a plant extract, and ii) at least one synthetic antioxidant, wherein the at least one synthetic antioxidant is selected from the group consisting of buthylhydroxyanisol, buthylhydroxytoluol, propyl-3,4,5-trihydroxybenzoate, sulfur dioxide, sodium sulfite, sodium hydrogensulfite, sodium disulfite, potassium disulfite, calcium sulfite, calcium hydrogensulfite, potassium hydrogen sulfite, sodium L-ascorbate, calcium L-ascorbate, esters, octygallate, tertiary butylhydroquinone (TBHQ), citric acid salts, sodium citrate, potassium citrate, calcium disodium EDTA, diphosphates, disodium diphosphate, trisodium diphosphate, tetrasodium diphosphate, Diphosphate diphosphate, calcium diphosphate, triphosphates, pentasodium triphosphate, pentakalium triphosphate, polyphosphate, sodium polyphosphate, potassium polyphosphate, sodium calcium polyphosphate, calcium polyphosphate, tin-II-chloride, and iii) at least one acidity regulator component to regulate the pH, wherein the at least one acidity regulator component is citric acid, wherein the pet food composition does preferably not contain 1,2-dihydro-6-ethoxy-2,2,4-trimethylquinoline.

The invention envisages a pet food composition comprising i) at least one natural antioxidant, wherein the at least one natural antioxidant is selected from the group of tocopherol and/or ascorbic acid and/or a plant extract, wherein the plant extract comprises oregano, salvia and/or rosemary extract and ii) at least one synthetic antioxidant, wherein the at least one synthetic antioxidant is selected from the group consisting of buthylhydroxyanisol, buthylhydroxytoluol, propyl-3,4,5-trihydroxybenzoate, sulfur dioxide, sodium sulfite, sodium hydrogensulfite, sodium disulfite, potassium disulfite, calcium sulfite, calcium hydrogensulfite, potassium hydrogen sulfite, sodium L-ascorbate, calcium L-ascorbate, esters, octygallate, tertiary butylhydroquinone (TBHQ), citric acid salts, sodium citrate, potassium citrate, calcium disodium EDTA, diphosphates, disodium diphosphate, trisodium diphosphate, tetrasodium diphosphate, Diphosphate diphosphate, calcium diphosphate, triphosphates, pentasodium triphosphate, pentakalium triphosphate, polyphosphate, sodium polyphosphate, potassium polyphosphate, sodium calcium polyphosphate, calcium polyphosphate, tin-II-chloride, and iii) at least one acidity regulator component to regulate the pH, wherein the at least one acidity regulator component is citric acid, wherein the pet food composition does preferably not contain 1,2-dihydro-6-ethoxy-2,2,4-trimethylquinoline.

The invention envisages a pet food composition comprising i) at least one natural antioxidant, wherein the at least one natural antioxidant is a combination of rosemary extract and tocopherol, and ii) at least one synthetic antioxidant, wherein the at least one synthetic antioxidant is selected from the group consisting of buthylhydroxyanisol, buthylhydroxytoluol, propyl-3,4,5-trihydroxybenzoate, sulfur dioxide, sodium sulfite, sodium hydrogensulfite, sodium disulfite, potassium disulfite, calcium sulfite, calcium hydrogensulfite, potassium hydrogen sulfite, sodium L-ascorbate, calcium L-ascorbate, esters, octygallate, tertiary butylhydroquinone (TBHQ), citric acid salts, sodium citrate, potassium citrate, calcium disodium EDTA, diphosphates, disodium diphosphate, trisodium diphosphate, tetrasodium diphosphate, Diphosphate diphosphate, calcium diphosphate, triphosphates, pentasodium triphosphate, pentakalium triphosphate, polyphosphate, sodium polyphosphate, potassium polyphosphate, sodium calcium polyphosphate, calcium polyphosphate, tin-II-chloride, and iii) at least one acidity regulator component to regulate the pH, wherein the at least one acidity regulator component is citric acid, wherein the pet food composition does preferably not contain 1,2-dihydro-6-ethoxy-2,2,4-trimethylquinoline.

The invention encompasses a pet food composition comprising i) at least one natural antioxidant, wherein the at least one natural antioxidant is a combination of rosemary extract and tocopherol in a ratio of 1:0.1 to 1:5, and ii) at least one synthetic antioxidant, wherein the at least one synthetic antioxidant is selected from the group consisting of buthylhydroxyanisol, buthylhydroxytoluol, propyl-3,4,5-trihydroxybenzoate, sulfur dioxide, sodium sulfite, sodium hydrogensulfite, sodium disulfite, potassium disulfite, calcium sulfite, calcium hydrogensulfite, potassium hydrogen sulfite, sodium L-ascorbate, calcium L-ascorbate, esters, octygallate, tertiary butylhydroquinone (TBHQ), citric acid salts, sodium citrate, potassium citrate, calcium disodium EDTA, diphosphates, disodium diphosphate, trisodium diphosphate, tetrasodium diphosphate, Diphosphate diphosphate, calcium diphosphate, triphosphates, pentasodium triphosphate, pentakalium triphosphate, polyphosphate, sodium polyphosphate, potassium polyphosphate, sodium calcium polyphosphate, calcium polyphosphate, tin-II-chloride, and iii) at least one acidity regulator component to regulate the pH, wherein the at least one acidity regulator component is citric acid, wherein the pet food composition does preferably not contain 1,2-dihydro-6-ethoxy-2,2,4-trimethylquinoline.

The invention envisages a pet food composition comprising i) at least one natural antioxidant, wherein the at least one natural antioxidant is selected from the group of tocopherol and/or ascorbic acid and/or a plant extract, and ii) at least one synthetic antioxidant, wherein the at least one synthetic antioxidant is in the composition in an amount from 0.001% to 1.0% based on the crude fat content of the pet food composition and iii) at least one acidity regulator component to regulate the pH, wherein the at least one acidity regulator component is selected from the group consisting of citric acid, formic acid, propanoic acid, lactic acid and sorbic acid, wherein the pet food composition does preferably not contain 1,2-dihydro-6-ethoxy-2,2,4-trimethylquinoline.

The invention envisages a pet food composition comprising i) at least one natural antioxidant, wherein the at least one natural antioxidant is selected from the group of tocopherol and/or ascorbic acid and/or a plant extract, wherein the plant extract comprises oregano, salvia and/or rosemary extract and ii) at least one synthetic antioxidant, wherein the at least one synthetic antioxidant is in the composition in an amount from 0.001% to 1.0% based on the crude fat content of the pet food composition, and iii) at least one acidity regulator component to regulate the pH, wherein the at least one acidity regulator component is selected from the group consisting of citric acid, formic acid, propanoic acid, lactic acid and sorbic acid, wherein the pet food composition does preferably not contain 1,2-dihydro-6-ethoxy-2,2,4-trimethylquinoline.

The invention envisages a pet food composition comprising i) at least one natural antioxidant, wherein the at least one natural antioxidant is a combination of rosemary extract and tocopherol, and ii) at least one synthetic antioxidant, wherein the at least one synthetic antioxidant is in the composition in an amount from 0.001% to 1.0% based on the crude fat content of the pet food composition and iii) at least one acidity regulator component to regulate the pH, wherein the at least one acidity regulator component is selected from the group consisting of citric acid, formic acid, propanoic acid, lactic acid and sorbic acid, wherein the pet food composition does preferably not contain 1,2-dihydro-6-ethoxy-2,2,4-trimethylquinoline.

The invention encompasses a pet food composition comprising i) at least one natural antioxidant, wherein the at least one natural antioxidant is a combination of rosemary extract and tocopherol in a ratio of 1:0.1 to 1:5, and ii) at least one synthetic antioxidant, wherein the at least one synthetic antioxidant is in the composition in an amount from 0.001% to 1.0% based on the crude fat content of the pet food composition, and iii) at least one acidity regulator component to regulate the pH, wherein the at least one acidity regulator component is selected from the group consisting of citric acid, formic acid, propanoic acid, lactic acid and sorbic acid, wherein the pet food composition does preferably not contain 1,2-dihydro-6-ethoxy-2,2,4-trimethylquinoline.

The invention envisages a pet food composition comprising i) at least one natural antioxidant, wherein the at least one natural antioxidant is selected from the group of tocopherol and/or ascorbic acid and/or a plant extract, and ii) at least one synthetic antioxidant, wherein the at least one synthetic antioxidant is in the composition in an amount from 0.001% to 1.0% based on the crude fat content of the pet food composition and iii) at least one acidity regulator component to regulate the pH, wherein the at least one acidity regulator component is in the composition in an amount from 0.001% to 10% by weight of the composition, wherein the pet food composition does preferably not contain 1,2-dihydro-6-ethoxy-2,2,4-trimethylquinoline.

The invention envisages a pet food composition comprising i) at least one natural antioxidant, wherein the at least one natural antioxidant is selected from the group of tocopherol and/or ascorbic acid and/or a plant extract, wherein the plant extract comprises oregano, salvia and/or rosemary extract and ii) at least one synthetic antioxidant, wherein the at least one synthetic antioxidant is in the composition in an amount from 0.001% to 1.0% based on the crude fat content of the pet food composition, and iii) at least one acidity regulator component to regulate the pH, wherein the at least one acidity regulator component is in the composition in an amount from 0.001% to 10% by weight of the composition, wherein the pet food composition does preferably not contain 1,2-dihydro-6-ethoxy-2,2,4-trimethylquinoline.

The invention envisages a pet food composition comprising i) at least one natural antioxidant, wherein the at least one natural antioxidant is a combination of rosemary extract and tocopherol, and ii) at least one synthetic antioxidant, wherein the at least one synthetic antioxidant is in the composition in an amount from 0.001% to 1.0% based on the crude fat content of the pet food composition and iii) at least one acidity regulator component to regulate the pH, wherein the at least one acidity regulator component is in the composition in an amount from 0.001% to 10% by weight of the composition, wherein the pet food composition does preferably not contain 1,2-dihydro-6-ethoxy-2,2,4-trimethylquinoline.

The invention encompasses a pet food composition comprising i) at least one natural antioxidant, wherein the at least one natural antioxidant is a combination of rosemary extract and tocopherol in a ratio of 1:0.1 to 1:5, and ii) at least one synthetic antioxidant, wherein the at least one synthetic antioxidant is in the composition in an amount from 0.001% to 1.0% based on the crude fat content of the pet food composition, and iii) at least one acidity regulator component to regulate the pH, wherein the at least one acidity regulator component is in the composition in an amount from 0.001% to 10% by weight of the composition, wherein the pet food composition does preferably not contain 1,2-dihydro-6-ethoxy-2,2,4-trimethylquinoline.

The invention envisages a pet food composition comprising i) at least one natural antioxidant, wherein the at least one natural antioxidant is selected from the group of tocopherol and/or ascorbic acid and/or a plant extract, and ii) at least one synthetic antioxidant, wherein the at least one synthetic antioxidant is in the composition in an amount from 0.001% to 1.0% based on the crude fat content of the pet food composition and iii) at least one acidity regulator component to regulate the pH, wherein the at least one acidity regulator component is citric acid, wherein the pet food composition does preferably not contain 1,2-dihydro-6-ethoxy-2,2,4-trimethylquinoline.

The invention envisages a pet food composition comprising i) at least one natural antioxidant, wherein the at least one natural antioxidant is selected from the group of tocopherol and/or ascorbic acid and/or a plant extract, wherein the plant extract comprises oregano, salvia and/or rosemary extract and ii) at least one synthetic antioxidant, wherein the at least one synthetic antioxidant is in the composition in an amount from 0.001% to 1.0% based on the crude fat content of the pet food composition, and iii) at least one acidity regulator component to regulate the pH, wherein the at least one acidity regulator component is citric acid, wherein the pet food composition does preferably not contain 1,2-dihydro-6-ethoxy-2,2,4-trimethylquinoline.

The invention envisages a pet food composition comprising i) at least one natural antioxidant, wherein the at least one natural antioxidant is a combination of rosemary extract and tocopherol, and ii) at least one synthetic antioxidant, wherein the at least one synthetic antioxidant is in the composition in an amount from 0.001% to 1.0% based on the crude fat content of the pet food composition and iii) at least one acidity regulator component to regulate the pH, wherein the at least one acidity regulator component is citric acid, wherein the pet food composition does preferably not contain 1,2-dihydro-6-ethoxy-2,2,4-trimethylquinoline.

The invention encompasses a pet food composition comprising i) at least one natural antioxidant, wherein the at least one natural antioxidant is a combination of rosemary extract and tocopherol in a ratio of 1:0.1 to 1:5, and ii) at least one synthetic antioxidant, wherein the at least one synthetic antioxidant is in the composition in an amount from 0.001% to 1.0% based on the crude fat content of the pet food composition, and iii) at least one acidity regulator component to regulate the pH, wherein the at least one acidity regulator component is citric acid, wherein the pet food composition does preferably not contain 1,2-dihydro-6-ethoxy-2,2,4-trimethylquinoline.

The invention envisages a pet food composition comprising i) at least one natural antioxidant, wherein the at least one natural antioxidant is selected from the group of tocopherol and/or ascorbic acid and/or a plant extract, and ii) at least one synthetic antioxidant, wherein the at least one synthetic antioxidant is buthylhydroxytoluol and/or propyl-3,4,5-trihydroxybenzoate, and iii) at least one acidity regulator component to regulate the pH, wherein the at least one acidity regulator component is selected from the group consisting of citric acid, formic acid, propanoic acid, lactic acid and sorbic acid, wherein the pet food composition does preferably not contain 1,2-dihydro-6-ethoxy-2,2,4-trimethylquinoline.

The invention envisages a pet food composition comprising i) at least one natural antioxidant, wherein the at least one natural antioxidant is selected from the group of tocopherol and/or ascorbic acid and/or a plant extract, wherein the plant extract comprises oregano, salvia and/or rosemary extract and ii) at least one synthetic antioxidant, wherein the at least one synthetic antioxidant is buthylhydroxytoluol and/or propyl-3,4,5-trihydroxybenzoate, and iii) at least one acidity regulator component to regulate the pH, wherein the at least one acidity regulator component is selected from the group consisting of citric acid, formic acid, propanoic acid, lactic acid and sorbic acid, wherein the pet food composition does preferably not contain 1,2-dihydro-6-ethoxy-2,2,4-trimethylquinoline.

The invention envisages a pet food composition comprising i) at least one natural antioxidant, wherein the at least one natural antioxidant is a combination of rosemary extract and tocopherol, and ii) at least one synthetic antioxidant, wherein the at least one synthetic antioxidant is buthylhydroxytoluol and/or propyl-3,4,5-trihydroxybenzoate, and iii) at least one acidity regulator component to regulate the pH, wherein the at least one acidity regulator component is selected from the group consisting of citric acid, formic acid, propanoic acid, lactic acid and sorbic acid, wherein the pet food composition does preferably not contain 1,2-dihydro-6-ethoxy-2,2,4-trimethylquinoline.

The invention encompasses a pet food composition comprising i) at least one natural antioxidant, wherein the at least one natural antioxidant is a combination of rosemary extract and tocopherol in a ratio of 1:0.1 to 1:5, and ii) at least one synthetic antioxidant, wherein the at least one synthetic antioxidant is buthylhydroxytoluol and/or propyl-3,4,5-trihydroxybenzoate, and iii) at least one acidity regulator component to regulate the pH, wherein the at least one acidity regulator component is selected from the group consisting of citric acid, formic acid, propanoic acid, lactic acid and sorbic acid, wherein the pet food composition does preferably not contain 1,2-dihydro-6-ethoxy-2,2,4-trimethylquinoline.

The invention envisages a pet food composition comprising i) at least one natural antioxidant, wherein the at least one natural antioxidant is selected from the group of tocopherol and/or ascorbic acid and/or a plant extract, and ii) at least one synthetic antioxidant, wherein the at least one synthetic antioxidant is buthylhydroxyanisol and/or propyl-3,4,5-trihydroxybenzoate, and iii) at least one acidity regulator component to regulate the pH, wherein the at least one acidity regulator component is selected from the group consisting of citric acid, formic acid, propanoic acid, lactic acid and sorbic acid, wherein the pet food composition does preferably not contain 1,2-dihydro-6-ethoxy-2,2,4-trimethylquinoline.

The invention envisages a pet food composition comprising i) at least one natural antioxidant, wherein the at least one natural antioxidant is selected from the group of tocopherol and/or ascorbic acid and/or a plant extract, wherein the plant extract comprises oregano, salvia and/or rosemary extract and ii) at least one synthetic antioxidant, wherein the at least one synthetic antioxidant is buthylhydroxyanisol and/or propyl-3,4,5-trihydroxybenzoate, and iii) at least one acidity regulator component to regulate the pH, wherein the at least one acidity regulator component is selected from the group consisting of citric acid, formic acid, propanoic acid, lactic acid and sorbic acid, wherein the pet food composition does preferably not contain 1,2-dihydro-6-ethoxy-2,2,4-trimethylquinoline.

The invention envisages a pet food composition comprising i) at least one natural antioxidant, wherein the at least one natural antioxidant is a combination of rosemary extract and tocopherol, and ii) at least one synthetic antioxidant, wherein the at least one synthetic antioxidant is buthylhydroxyanisol and/or propyl-3,4,5-trihydroxybenzoate, and iii) at least one acidity regulator component to regulate the pH, wherein the at least one acidity regulator component is selected from the group consisting of citric acid, formic acid, propanoic acid, lactic acid and sorbic acid, wherein the pet food composition does preferably not contain 1,2-dihydro-6-ethoxy-2,2,4-trimethylquinoline.

The invention encompasses a pet food composition comprising i) at least one natural antioxidant, wherein the at least one natural antioxidant is a combination of rosemary extract and tocopherol in a ratio of 1:0.1 to 1:5, and ii) at least one synthetic antioxidant, wherein the at least one synthetic antioxidant is buthylhydroxyanisol and/or propyl-3,4,5-trihydroxybenzoate, and iii) at least one acidity regulator component to regulate the pH, wherein the at least one acidity regulator component is selected from the group consisting of citric acid, formic acid, propanoic acid, lactic acid and sorbic acid, wherein the pet food composition does preferably not contain 1,2-dihydro-6-ethoxy-2,2,4-trimethylquinoline.

The invention envisages a pet food composition comprising i) at least one natural antioxidant, wherein the at least one natural antioxidant is selected from the group of tocopherol and/or ascorbic acid and/or a plant extract, and ii) at least one synthetic antioxidant, wherein the at least one synthetic antioxidant is buthylhydroxytoluol and/or propyl-3,4,5-trihydroxybenzoate, and iii) at least one acidity regulator component to regulate the pH, wherein the at least one acidity regulator component is in the composition in an amount from 0.001% to 10% by weight of the composition, wherein the pet food composition does preferably not contain 1,2-dihydro-6-ethoxy-2,2,4-trimethylquinoline.

The invention envisages a pet food composition comprising i) at least one natural antioxidant, wherein the at least one natural antioxidant is selected from the group of tocopherol and/or ascorbic acid and/or a plant extract, wherein the plant extract comprises oregano, salvia and/or rosemary extract and ii) at least one synthetic antioxidant, wherein the at least one synthetic antioxidant is buthylhydroxytoluol and/or propyl-3,4,5-trihydroxybenzoate, and iii) at least one acidity regulator component to regulate the pH, wherein the at least one acidity regulator component is in the composition in an amount from 0.001% to 10% by weight of the composition, wherein the pet food composition does preferably not contain 1,2-dihydro-6-ethoxy-2,2,4-trimethylquinoline.

The invention envisages a pet food composition comprising i) at least one natural antioxidant, wherein the at least one natural antioxidant is a combination of rosemary extract and tocopherol, and ii) at least one synthetic antioxidant, wherein the at least one synthetic antioxidant is buthylhydroxytoluol and/or propyl-3,4,5-trihydroxybenzoate, and iii) at least one acidity regulator component to regulate the pH, wherein the at least one acidity regulator component is in the composition in an amount from 0.001% to 10% by weight of the composition, wherein the pet food composition does preferably not contain 1,2-dihydro-6-ethoxy-2,2,4-trimethylquinoline.

The invention encompasses a pet food composition comprising i) at least one natural antioxidant, wherein the at least one natural antioxidant is a combination of rosemary extract and tocopherol in a ratio of 1:0.1 to 1:5, and ii) at least one synthetic antioxidant, wherein the at least one synthetic antioxidant is buthylhydroxytoluol and/or propyl-3,4,5-trihydroxybenzoate, and iii) at least one acidity regulator component to regulate the pH, wherein the at least one acidity regulator component is in the composition in an amount from 0.001% to 10% by weight of the composition, wherein the pet food composition does preferably not contain 1,2-dihydro-6-ethoxy-2,2,4-trimethylquinoline.

The invention envisages a pet food composition comprising i) at least one natural antioxidant, wherein the at least one natural antioxidant is selected from the group of tocopherol and/or ascorbic acid and/or a plant extract, and ii) at least one synthetic antioxidant, wherein the at least one synthetic antioxidant is buthylhydroxyanisol and/or propyl-3,4,5-trihydroxybenzoate, and iii) at least one acidity regulator component to regulate the pH, wherein the at least one acidity regulator component is in the composition in an amount from 0.001% to 10% by weight of the composition, wherein the pet food composition does preferably not contain 1,2-dihydro-6-ethoxy-2,2,4-trimethylquinoline.

The invention envisages a pet food composition comprising i) at least one natural antioxidant, wherein the at least one natural antioxidant is selected from the group of tocopherol and/or ascorbic acid and/or a plant extract, wherein the plant extract comprises oregano, salvia and/or rosemary extract and ii) at least one synthetic antioxidant, wherein the at least one synthetic antioxidant is buthylhydroxyanisol and/or propyl-3,4,5-trihydroxybenzoate, and iii) at least one acidity regulator component to regulate the pH, wherein the at least one acidity regulator component is in the composition in an amount from 0.001% to 10% by weight of the composition, wherein the pet food composition does preferably not contain 1,2-dihydro-6-ethoxy-2,2,4-trimethylquinoline.

The invention envisages a pet food composition comprising i) at least one natural antioxidant, wherein the at least one natural antioxidant is a combination of rosemary extract and tocopherol, and ii) at least one synthetic antioxidant, wherein the at least one synthetic antioxidant is buthylhydroxyanisol and/or propyl-3,4,5-trihydroxybenzoate, and iii) at least one acidity regulator component to regulate the pH, wherein the at least one acidity regulator component is in the composition in an amount from 0.001% to 10% by weight of the composition, wherein the pet food composition does preferably not contain 1,2-dihydro-6-ethoxy-2,2,4-trimethylquinoline.

The invention encompasses a pet food composition comprising i) at least one natural antioxidant, wherein the at least one natural antioxidant is a combination of rosemary extract and tocopherol in a ratio of 1:0.1 to 1:5, and ii) at least one synthetic antioxidant, wherein the at least one synthetic antioxidant is buthylhydroxyanisol and/or propyl-3,4,5-trihydroxybenzoate, and iii) at least one acidity regulator component to regulate the pH, wherein the at least one acidity regulator component is in the composition in an amount from 0.001% to 10% by weight of the composition, wherein the pet food composition does preferably not contain 1,2-dihydro-6-ethoxy-2,2,4-trimethylquinoline.

The invention envisages a pet food composition comprising i) at least one natural antioxidant, wherein the at least one natural antioxidant is selected from the group of tocopherol and/or ascorbic acid and/or a plant extract, and ii) at least one synthetic antioxidant, wherein the at least one synthetic antioxidant is buthylhydroxytoluol and/or propyl-3,4,5-trihydroxybenzoate, and iii) at least one acidity regulator component to regulate the pH, wherein the at least one acidity regulator component is citric acid, wherein the pet food composition does preferably not contain 1,2-dihydro-6-ethoxy-2,2,4-trimethylquinoline.

The invention envisages a pet food composition comprising i) at least one natural antioxidant, wherein the at least one natural antioxidant is selected from the group of tocopherol and/or ascorbic acid and/or a plant extract, wherein the plant extract comprises oregano, salvia and/or rosemary extract and ii) at least one synthetic antioxidant, wherein the at least one synthetic antioxidant is buthylhydroxytoluol and/or propyl-3,4,5-trihydroxybenzoate, and iii) at least one acidity regulator component to regulate the pH, wherein the at least one acidity regulator component is citric acid, wherein the pet food composition does preferably not contain 1,2-dihydro-6-ethoxy-2,2,4-trimethylquinoline.

The invention envisages a pet food composition comprising i) at least one natural antioxidant, wherein the at least one natural antioxidant is a combination of rosemary extract and tocopherol, and ii) at least one synthetic antioxidant, wherein the at least one synthetic antioxidant is buthylhydroxytoluol and/or propyl-3,4,5-trihydroxybenzoate, and iii) at least one acidity regulator component to regulate the pH, wherein the at least one acidity regulator component is citric acid, wherein the pet food composition does preferably not contain 1,2-dihydro-6-ethoxy-2,2,4-trimethylquinoline.

The invention encompasses a pet food composition comprising i) at least one natural antioxidant, wherein the at least one natural antioxidant is a combination of rosemary extract and tocopherol in a ratio of 1:0.1 to 1:5, and ii) at least one synthetic antioxidant, wherein the at least one synthetic antioxidant is buthylhydroxytoluol and/or propyl-3,4,5-trihydroxybenzoate, and iii) at least one acidity regulator component to regulate the pH, wherein the at least one acidity regulator component is citric acid, wherein the pet food composition does preferably not contain 1,2-dihydro-6-ethoxy-2,2,4-trimethylquinoline.

The invention envisages a pet food composition comprising i) at least one natural antioxidant, wherein the at least one natural antioxidant is selected from the group of tocopherol and/or ascorbic acid and/or a plant extract, and ii) at least one synthetic antioxidant, wherein the at least one synthetic antioxidant is buthylhydroxyanisol and/or propyl-3,4,5-trihydroxybenzoate, and iii) at least one acidity regulator component to regulate the pH, wherein the at least one acidity regulator component is citric acid, wherein the pet food composition does preferably not contain 1,2-dihydro-6-ethoxy-2,2,4-trimethylquinoline.

The invention envisages a pet food composition comprising i) at least one natural antioxidant, wherein the at least one natural antioxidant is selected from the group of tocopherol and/or ascorbic acid and/or a plant extract, wherein the plant extract comprises oregano, salvia and/or rosemary extract and ii) at least one synthetic antioxidant, wherein the at least one synthetic antioxidant is buthylhydroxyanisol and/or propyl-3,4,5-trihydroxybenzoate, and iii) at least one acidity regulator component to regulate the pH, wherein the at least one acidity regulator component is citric acid, wherein the pet food composition does preferably not contain 1,2-dihydro-6-ethoxy-2,2,4-trimethylquinoline.

The invention envisages a pet food composition comprising i) at least one natural antioxidant, wherein the at least one natural antioxidant is a combination of rosemary extract and tocopherol, and ii) at least one synthetic antioxidant, wherein the at least one synthetic antioxidant is buthylhydroxyanisol and/or propyl-3,4,5-trihydroxybenzoate, and iii) at least one acidity regulator component to regulate the pH, wherein the at least one acidity regulator component is citric acid, wherein the pet food composition does preferably not contain 1,2-dihydro-6-ethoxy-2,2,4-trimethylquinoline.

The invention encompasses a pet food composition comprising i) at least one natural antioxidant, wherein the at least one natural antioxidant is a combination of rosemary extract and tocopherol in a ratio of 1:0.1 to 1:5, and ii) at least one synthetic antioxidant, wherein the at least one synthetic antioxidant is buthylhydroxyanisol and/or propyl-3,4,5-trihydroxybenzoate, and iii) at least one acidity regulator component to regulate the pH, wherein the at least one acidity regulator component is citric acid, wherein the pet food composition does preferably not contain 1,2-dihydro-6-ethoxy-2,2,4-trimethylquinoline.

Preferably, the invention comprises the pet food composition, wherein i) the at least one natural antioxidant is a combination of rosemary extract and tocopherol in a ratio of 1:0.1 to 1:5, ii) the at least one synthetic antioxidant is buthylhydroxytoluol and/or propyl-3,4,5-trihydroxybenzoate, and iii) the at least one acidity regulator component is citric acid, wherein the pet food composition does preferably not contain 1,2-dihydro-6-ethoxy-2,2,4-trimethylquinoline.

The term "1,2-dihydro-6-ethoxy-2,2,4-trimethylquinoline" refers to ethoxyquin (EQ), which is a quinoline-based synthetic antioxidant used as a food preservative in certain countries. It is used as a preservative in some pet foods to prevent the rancidification of fats. Preferably, fish meal is protected with the synthetic antioxidant. It has been speculated that ethoxyquin in pet foods such as in fish meal might be responsible for multiple health problems, for the animal itself and for the consumer eating the animal (such as fish). Thus, food safety concerns have been raised to reduce maximal levels of synthetic antioxidants such as ethoxyquin allowed in food for human consumption (Bohne et al. 2008, *Food and Chemical Toxicology*, 46, 1834-1843).

The pet food composition may further comprise a dietary component selected from the group consisting of a fat, an oil, a protein, a vitamin, a starch, a flavoring agent and a coloring agent. The pet food composition may further comprise a dietary component, which comprises (a) fat(s) and (an) oil(s) and (a) protein(s) and (a) vitamin(s) and (a) starch(es) and (a) flavoring agent(s) and (a) coloring agent (s). The pet food composition may further comprise a dietary component, which comprises (a) fat(s) or (an) oil(s) or (a) protein(s) or (a) vitamin(s) or (a) starch(es) or (a) flavoring agent(s) or (a) coloring agent(s).

The pet food may comprise fat(s) and oil(s). Fat include animal fats such as tallow, or vegetable fats such as hydrogenated soy fat. Any suitable oil may be used; for example vegetable oils such as sunflower oil, safflower oil, corn oil, and the like. Oils which are high in mono-d fats are particularly preferred. Hydrogenated oils or fats are also preferred. Liquid fats and oils form the lipophilic matrix of the pet food composition.

Further, the pet food comprises protein(s). Suitable protein sources may be selected from any suitable animal or vegetable protein source; for example meat meal, bone meal, fish meal, soy protein concentrates, milk proteins, gluten, and the like. The choice of the protein source will be largely determined by the nutritional needs, palatability considerations, and the type of cereal product produced. Of course, the starch source may also be a source of protein.

Vitamin(s), generally useful as food additives, is/are also comprised in the pet food composition, including vitamin A, vitamin B1, vitamin B2, vitamin B6, vitamin B12, vitamin D, biotin, vitamin K, folic acid, inositol, niacin, and pantothenic acid. Minerals and trace elements also useful as food additives include calcium, phosphorus, sodium, potassium, magnesium, copper, zinc, chloride, iron, selenium, iodine, and iron and may also be added to the pet food composition.

Suitable starch sources are, for example, grain flours such as corn, rice, wheat, beets, barley, soy and oats. Also mixtures of these flours may be used. The flours may be whole flours or may be flours which have had fractions removed; for example the germ fraction or husk fraction may be removed. Rice flour, corn flour and wheat flour are particularly suitable; either alone or in combination. The starch source will be chosen largely on the basis of the nutritional value, palatability considerations, and the type of pet food desired.

Suitable particulate flavouring agents include shrimp and krill meal, sugars, chocolate powders, milk powders, malted powders, flavored beverage powders, and the like. Coloring agents include for example carotinoids and algae. Proteins, vitamins, minerals, starch, flavouring, coloring agents and the like form the solid matrix of the pet food composition.

The pet food composition is primarily made up of the starch source and other ingredients such as sugar, salt, spices, seasonings, vitamins, minerals, fillers, binding agents, flavoring agents, coloring agents, emulsifiers, sweeteners, buffers, antioxidants, protein sources, fats, oils and the like known to skilled artisans. Specific amounts for each composition component, food ingredient, and other ingredients may depend on a variety of factors such as the particular components and ingredients included in the composition; the species of animal; the animal's age, body weight, general health, sex, and diet; the animal's consumption rate; and the like.

Additionally, the pet food composition may comprise a wet or dry food composition, which may be in the form of a moist food, semi-moist food, dry food, supplement or treat. The pet food composition may be in kibble form, flakes, pellets, sticks, granules, gelfood or tablets and the like. Preferably, the pet food composition is dry food.

In a preferred pet food composition the at least one natural antioxidant and the at least one synthetic antioxidant are integrated homogeneously into a lipophilic matrix, before obtaining the pet food composition.

Preferably, the additives (natural and synthetic antioxidants) are mixed into the lipophilic matrix thereby obtaining an enriched lipophilic matrix. The acidity regulator component is mixed into a premix thereby obtaining an enriched premix. Said enriched lipophilic matrix and said enriched premix are then homogeneously dispersed into a solid matrix. Subsequently, processing into the pet food composition occurs.

In this context, the term "premix" refers to a mixture of solids comprising a carrier being a substance that is already included in the main mix (the pet food composition) and comprising microcomponents. Microcomponents are substances whose amount in the formulation is less than 0.5%. Microcomponents are usually vitamins, trace elements, minerals and additives, preferably the at least one acidity regulator component to regulate the pH, more preferably citric acid. Thus, the premix may comprise a carrier and citric acid. The microcomponent such as citric acid may homogeneously be mixed into the carrier, resulting in the premix. Here, the carrier used in the premix is not the same carrier as described above with regard to the rosemary extract and/or tocopherol.

The term "integrated" means dispersed, distributed or mixed. In this context, the term "homogenously" means that the at least one natural antioxidant and the at least one synthetic antioxidant and the at least one acidity regulator component that is (dis)solved and/or dispersed in the lipophilic matrix is nearly evenly, preferably evenly, distributed in the lipophilic matrix so that the concentration ("c") of the at least one natural antioxidant and the at least one synthetic antioxidant and the at least one acidity regulator component ("n" in case of molar mass or "m" in case of mass) is nearly identical, preferably identical in (or throughout) the volume ("v") of the lipophilic matrix, i.e., $c=n/v$ or $c=m/v$, respectively, is nearly constant, preferably constant. Preferably there is no concentration gradient within the pet food composition.

The invention also comprises the integration of the enriched lipophilic matrix (enriched through the additives such as natural and synthetic antioxidants being mixed into the lipophilic matrix) into the pet food composition after processing the solid matrix into the pet food composition. This may occur through coating, spraying and/or vacuuming.

The pet may be a vertebrate and/or invertebrate. Vertebrates consist of "lower vertebrates" such as fishes and amphibians and "higher vertebrates" such as reptiles, birds and mammals. The vertebrates of the invention include higher vertebrates, which include, but are not limited to all kinds of mammals such as a cat, a kitten, a dog, a puppy, a horse, a mouse, a hamster, cattle, a pig, a sheep and the like. The vertebrates of the invention include lower vertebrates as well, which include, but are not limited to all kinds of fish.

Preferably, the vertebrate is a lower vertebrate, preferably a fish, more preferably a bony fish (Osteichthyes), most preferably an ornamental fish belonging e.g. to the family of characins, barbs, cichlids, live bearers, cyprinids. In a preferred embodiment the pet is a red phantom tetra and/or a yellow cichlid (*Labidochromis*).

Additionally, the pet food composition of the invention may be palatable for fish. Thus, the invention comprises a pet food composition, wherein the pet food composition may be palatable for fish. Palatability of the pet food composition may be achieved through mixing the additives (the at least one natural antioxidant and the at least one synthetic antioxidant of the invention) into a lipophilic matrix before obtaining the pet food composition. Additionally, palatability of the pet food composition is preferably be achieved by mixing the at least one acidity regulator component used for the acceptance and attractiveness enhancement, weight enhancement and optimized feed utilization into a premix, before the enriched lipophilic matrix and the enriched premix may homogeneously be dispersed into a solid matrix and then processed into the pet food composition of the invention.

Further, the pet food composition enhances the weight in a fish. Thus, the invention comprises a pet food composition, wherein the pet food composition may enhance the weight in a fish. The weight increase of a fish (%/pisces) due to more food intake of said aquatic subject, which finds the pet food very palatable by reason of its specifically composition according to the invention, is measured with a special digital scale with mode for moving animals, preferably suitable for fish.

The term "enhance/increase the weight", or "weight increase" refers to the increase/enhancement of the body weight of the pet, preferably of the fish. The increase of the body weight does not only refer to the increase of body fat. The pet's body (in particular the fish's body) becomes proportionally larger/bigger, meaning that there is an increase in muscle mass, organ growth and bone growth. The increased growth of the pet is defined by the weight increase. Thus, the term "growth" may be used interchangeably with the term "weight".

Further, the pet of the invention may be an invertebrate. The invertebrate may be a decapod. The decapods are an order of crustaceans within the class Malacostraca. Decapods include many familiar groups, such as crayfish, crabs, lobsters, prawns, and shrimp.

Method of Producing a Pet Food Composition

The invention also envisage a method of producing a pet food composition, the method comprising a) mixing the additives of a pet food composition comprising i) at least one natural antioxidant, and ii) at least one synthetic antioxidant into a lipophilic matrix, b) mixing the at least one acidity regulator component to regulate the pH into a premix c) applying the enriched lipophilic matrix of step a) and the enriched premix of step b) to a solid matrix before obtaining the pet food composition, d) obtaining the pet food composition.

The stabilization of the diet and of the lipophilic components can be carried out in the dietetic solid matrix prior to processing. In this case, the addition of the stabilizing components may be carried out via the lipophilic components. For this purpose, these stabilizing components (natural and synthetic antioxidants) may be mixed into a lipophilic substance matrix.

Step a) refers to the homogeneously integration of the additives (natural and synthetic antioxidants) into a lipophilic matrix, thereby obtaining an enriched lipophilic matrix. The additives used for the acceptance and attractiveness enhancement, weight enhancement and optimized feed utilization (such as the at least one acidity regulator component) may be mixed in step b) into a premix thereby obtaining an enriched premix. Preferably, mixing of the at least one acidity regulator component into the premix is achieved by homogenization in a normal mixer known to a person skilled in the art. After that, the enriched lipophilic matrix and the enriched premix may then be homogeneously dispersed into a solid matrix (feed matrix). Homogeneously dispersing the enriched lipophilic matrix and the premix into the solid matrix may be achieved in a normal mixer again. Different mixers may be used depending whether a solid mixture for extrudates such as pellets or a mash for the flake production may be produced. Subsequently, the pet food composition may be processed. Processing may take place in a flake drum (110-160° C.), in an extruder (80-180° C.), in a tablet machine (18-40° C.), in a pelletizer (20-120° C.). If moisture food and/or soft food may be processed, a temperature of 18-180° C. may be used. Temperatures may be dependent on the pet food composition, which is obtained, whether dry pet food such as pellets and/or flakes may be produced or wet pet food.

Non-Medical Uses

The invention further encompasses the use of a pet food composition for improving the palatability of the pet food composition and/or for enhancing the weight in a healthy pet. The invention further comprises the use of a pet food composition for improving the palatability of the pet food composition. The invention further encompasses the use of a pet food composition for enhancing the weight in a healthy pet. The invention further encompasses the use of a pet food composition for improving the palatability of the pet food composition and for enhancing the weight in a healthy pet. However, the same use of the pet food composition may also apply to a non-healthy pet.

The term "enhancing" may be used interchangeably with the term improving or increasing.

The term "a healthy pet" refers to a pet not suffering from any disorders/diseases. Thus, the pet is being well.

The synergistic effect of a combination of synthetic and natural antioxidants in a specific ratio, with the effect of a pH-lowering and thus acceptability-improving component (see diet SNC in FIG. 1) may increase the weight of aquatic subjects by up to 2.5%, or by up to 3%, 3.5%, 4%, 4.5%, 5%, 5.5%, 6%, 6.5%, 7%, 7.5%, 8%, 8.5%, 9%, 9.5%, 10%, 10.5%, 11%, 11.5%, 12%, 12.5%, 13%, 13.5%, 14%, 14.5%, 15%, 15.5%, 16%, 16.5%, 17%, 17.5%, 18%, 18.5%, 19%, 19.5%, 20%, 25%, 30%, 35%, 40%, 45%, 50%, 55%, 60%, 65%, 70%, 75%, 80%, 85%, 90%, 95% or even by up to 100%. The term "by up to %" means an increase/decrease of the number indicated, not including 0% increase/decrease.

Preferably, it increases the weight of aquatic subjects by up to 14% in comparison to the control diet without supplementation. Said combination may increase the weight of aquatic subjects by about 14% in comparison to the control diet without supplementation if the pet is a red phantom tetra (see diet SNC for the red phantom tetra in FIG. 1). The addition of natural antioxidants (see diet NC for both targets in FIG. 1) may adversely affect the weight of the individual species by up to 6% compared to the control diet, showing that only the addition of the natural antioxidants such as tocopherol and rosemary extract with the effect of the acidity regulator component citric acid may not be sufficient to make the pet food composition more palatable and thereby increasing the weight of the aquatic subjects. The addition of the synthetic antioxidants (see diet SC for both targets in FIG. 1) may not affect the weight of the individual species compared to the control diet, demonstrating that only the addition of the synthetic antioxidants such as buthylhydroxytoluol (or buthylhydroxyanisol) and propyl-3,4,5-trihydroxybenzoate with the effect of the acidity regulator component citric acid may not be sufficient to make the pet food composition more palatable and thereby increasing the weight of the aquatic subjects.

Additionally, the invention comprises the use of a pet food composition for protecting the pet food composition against oxidation. The additives of the invention may act as electron donors, which may prevent the release of electrons of the dietary components, which are being protected. Lipid degradation can take place chemical-physical by absorbing odors, biochemically by the activity of tissue enzymes or microorganisms, or by delivery of electrons to the oxygen atom. In detail, the release of electrons occurs to the oxygen atom, which has only a single unpaired valence electron, thus being very aggressive. The strong pressure of filling the outer shell with another electron to be captured makes these substances so aggressive. Those aggressive oxygen atoms may react with the most diverse compounds and may destroy them by the reaction taking place.

The unsaturated fatty acids of the diet may spontaneously react with atmospheric oxygen in a diet. As the number of double bonds increases, the tendency to release more electrons also increases. In this process, peroxides and hydroperoxides are first formed, and aldehydes, acids, and polymerization products, which characterize the degraded lipid in a sensory manner, are formed in secondary reactions. They are responsible for the typical, bad taste of spoiled (degraded) lipids. The peroxides also inactivate certain nutrients, e.g. specific vitamins. As a result, the utilization of the diet deteriorates (the diet gets worse), the weight of the target species (e.g., lower vertebrates) stagnates and further physiological damages to the target species occur. For this reason, electron donators are often added which intercept the primarily developing atoms or molecules with at least one unpaired valence electron, thereby interrupting the continuous emission of electrons from the unsaturated fatty acids. Thus, the spoilage of the dietary component may be prevented.

Further, the invention envisages the use of a pet food composition for improving the water quality and reducing the growth of algae in the (artificial) habitat of a pet, preferably if the pet is a fish, more preferably if the pet is a bony fish, most preferably if the pet is an ornamental fish.

The invention also comprises a method of improving the palatability of a pet food composition, the method comprising, a) mixing the additives of a pet food composition comprising i) at least one natural antioxidant, and ii) at least one synthetic antioxidant into a lipophilic matrix, b) mixing the at least one acidity regulator component to regulate the pH into a premix thereby improving the palatability of a pet food composition in comparison to a premix not having applied the at least one acidity regulator component to, c) applying the enriched lipophilic matrix and the enriched premix to a solid matrix, optionally d) obtaining the pet food composition.

Further, a method of protecting a pet food composition against oxidation is also contemplated by the invention, the method comprising, a) mixing the additives of a pet food composition comprising i) at least one natural antioxidant, and ii) at least one synthetic antioxidant into a lipophilic matrix, thereby protecting the oxidation of the lipophilic matrix in comparison to a lipophilic matrix not having applied the mixed additives to b) mixing the at least one acidity regulator component to regulate the pH into a premix, c) applying the enriched lipophilic matrix and the enriched premix to a solid matrix, optionally d) obtaining the pet food composition.

A method of enhancing the weight in a pet comprising administering a pet food composition to the pet is also comprised by the invention. Also a method of enhancing the weight in a healthy pet comprising administering a pet food composition to the healthy pet is comprised by the invention. However, the same method of enhancing the weight may also apply to a non-healthy pet.

Medical Use

The invention also encompasses a pet food composition for use in a method of treating underweight in a pet. The term "weight deficiency" or "short weight" may be used interchangeably with the term "underweight". A pet suffering from underweight weighs less than is normal, healthy or required for said pet. Feeding the pet food composition of the invention to the pet suffering from underweight may be able to treat the limitation of said pet.

It is noted that as used herein, the singular forms "a", "an", and "the", include plural references unless the context clearly indicates otherwise. Thus, for example, reference to "a reagent" includes one or more of such different reagents and reference to "the method" includes reference to equivalent steps and methods known to those of ordinary skill in the art that could be modified or substituted for the methods described herein.

Unless otherwise indicated, the term "at least" preceding a series of elements is to be understood to refer to every element in the series. The term "at least one" refers to one or more such as two, three, four, five, six, seven, eight, nine, or ten. Those skilled in the art will recognize, or be able to ascertain using no more than routine experimentation, many equivalents to the specific embodiments of the invention described herein. Such equivalents are intended to be encompassed by the invention.

The term "and/or" wherever used herein includes the meaning of "and", "or" and "all or any other combination of the elements connected by said term".

The term "less than" or in turn "more than" does not include the concrete number.

For example, less than 20 means less than the number indicated. Similarly, more than or greater than means more than or greater than the indicated number.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integer or step. When used herein the term "comprising" can be substituted with the term "containing" or "including" or sometimes when used herein with the term "having". When used herein "consisting of" excludes any element, step, or ingredient not specified.

The term "including" means "including but not limited to". "Including" and "including but not limited to" are used interchangeably.

The term "about" means plus or minus 10%, preferably plus or minus 5%, more preferably plus or minus 2%, most preferably plus or minus 1%.

Throughout the description and claims of this specification, the singular encompasses the plural unless the context otherwise requires. In particular, where the indefinite article is used, the specification is to be understood as contemplating plurality as well as singularity, unless the context requires otherwise.

It should be understood that this invention is not limited to the particular methodology, protocols, material, reagents, and substances, etc., described herein and as such can vary. The terminology used herein is for the purpose of describing particular embodiments only, and is not intended to limit the scope of the invention, which is defined solely by the claims.

All publications cited throughout the text of this specification (including all patents, patent application, scientific publications, instructions, etc.), whether supra or infra, are hereby incorporated by reference in their entirety. Nothing herein is to be construed as an admission that the invention is not entitled to antedate such disclosure by virtue of prior invention. To the extent the material incorporated by reference contradicts or is inconsistent with this specification, the specification will supersede any such material.

The content of all documents and patent documents cited herein is incorporated by reference in their entirety.

A better understanding of the invention and of its advantages will be gained from the following examples, offered for illustrative purposes only. The examples are not intended to limit the scope of the invention in any way.

EXAMPLES OF THE INVENTION

Example 1: Pet Food Composition as a Diet for Lower Vertebrates

The combination of the stabilizing agents (at least one synthetic antioxidant and at least one natural antioxidant and at least one acidity regulator component; diet SNC in FIG. 1) of the invention in diets for lower vertebrates was tested for ornamental Osteichthyes (bony fishes such as the Red Phantom Tetra and the yellow Cichlid called *Labidochromis caeruleus*), being characteristic for the aquatic habitat, in cold and warm water, in comparison to a control diet without any stabilizing agents (control diet) and to different test diets with synthetic antioxidants with a supplementation of a pH-lowering component (diet SC in FIG. 1) or with natural antioxidants with a supplementation of a pH-lowering component (diet NC in FIG. 1) to three parallels each over a period of 12 weeks.

As internal results of feeding test demonstrate, the synergistic effect of a combination of synthetic and natural antioxidants in a specific ratio, with the effect of a pH-lowering and thus acceptability-improving component (diet SNC), increases the weight of the aquatic subjects (such as red phantom tetra and/or yellow cichlid) by up to 14% in comparison to the control diet without supplementation. As the results also show, the addition of natural antioxidants (diet NC) adversely affects the weight of the individual species by up to 6% compared to the control (FIG. 1).

What is claimed is:

1. A fish food composition comprising:
   i) at least one natural antioxidant, wherein the at least one natural antioxidant is a combination of rosemary extract and tocopherol,
   ii) at least one synthetic antioxidant selected from the group consisting of dibutylhydroxytoluene, propyl-3,4,5-trihydroxybenzoate, and combinations thereof,
   iii) at least one acidity regulator component to regulate the pH, wherein the at least one acidity regulator component is in the composition in an amount from 0.001% to 1% by weight of the composition, and
   iv) dry fish food flakes,
   wherein the fish food composition does not contain 1,2-dihydro-6-ethoxy-2,2,4-trimethylquinoline.

2. The fish food composition of claim 1, wherein the ratio of rosemary extract to tocopherol is 1:0.1 to 1:5.

3. The fish food composition of claim 1, wherein the at least one synthetic antioxidant is in the composition in an amount from 0.001% to 1.0% based on a crude fat content of the fish food composition.

4. The fish food composition of claim 1, wherein the at least one acidity regulator component is selected from the group consisting of citric acid, formic acid, propanoic acid, lactic acid, sorbic acid, and combinations thereof.

5. The fish food composition of claim 1, wherein the pH is below 6.2.

6. The fish food composition of claim 1, further comprising a dietary component selected from the group consisting of a fat, an oil, a protein, a vitamin, a starch, a flavoring agent, a coloring agent, and combinations thereof.

7. The fish food composition of claim 1, wherein the at least one natural antioxidant and the at least one synthetic antioxidant are integrated homogeneously into a lipophilic matrix.

8. A fish food composition comprising:
   i) at least one natural antioxidant, wherein the at least one natural antioxidant is a combination of rosemary extract and tocopherol in a ratio of 1:0.1 to 1:5,
   ii) at least one synthetic antioxidant selected from the group consisting of dibutylhydroxytoluene, propyl-3,4,5-trihydroxybenzoate, and combinations thereof,
   iii) an acidity regulator component to regulate the pH, wherein the acidity regulator component is citric acid and is present in the composition in an amount of from 0.001% to 10% by weight of the composition, and
   iv) dry fish food flakes,
   wherein the fish food composition does not contain 1,2-dihydro-6-ethoxy-2,2,4-trimethylquinoline.

9. The fish food composition of claim 8, wherein the at least one synthetic antioxidant is in the composition in an amount from 0.001% to 1.0% based on a crude fat content of the fish food composition.

10. The fish food composition of claim 8, wherein the pH is below 6.2.

11. The fish food composition of claim 8, further comprising a dietary component selected from the group consisting of a fat, an oil, a protein, a vitamin, a starch, a flavoring agent, a coloring agent,. and combinations thereof.

12. The fish food composition of claim 8, wherein the at least one natural antioxidant and the at least one synthetic antioxidant are integrated homogeneously into a lipophilic matrix.

* * * * *